(12) United States Patent
Wilson

(10) Patent No.: US 11,658,950 B2
(45) Date of Patent: May 23, 2023

(54) CENTRALIZED SECURE DISTRIBUTION OF MESSAGES AND DEVICE UPDATES

(71) Applicant: ValiMail Inc., San Francisco, CA (US)

(72) Inventor: Ashley Duane Wilson, San Francisco, CA (US)

(73) Assignee: ValiMail Inc., San Francisco, CA (US)

( * ) Notice: Subject to any disclaimer, the term of this patent is extended or adjusted under 35 U.S.C. 154(b) by 182 days.

(21) Appl. No.: 17/087,620

(22) Filed: Nov. 3, 2020

(65) Prior Publication Data

US 2021/0136047 A1    May 6, 2021

Related U.S. Application Data

(60) Provisional application No. 62/929,889, filed on Nov. 3, 2019.

(51) Int. Cl.
*H04L 29/06* (2006.01)
*G06F 16/953* (2019.01)
(Continued)

(52) U.S. Cl.
CPC ........ *H04L 63/0435* (2013.01); *G06F 16/953* (2019.01); *H04L 9/30* (2013.01); *H04L 9/3268* (2013.01)

(58) Field of Classification Search
CPC ..... H04L 63/0435; H04L 9/30; H04L 9/3268; G06F 16/953
See application file for complete search history.

(56) References Cited

U.S. PATENT DOCUMENTS

| 10,050,944 B2* | 8/2018 | Byszio | H04L 67/1097 |
| 10,601,594 B2* | 3/2020 | Choyi | H04W 12/069 |

(Continued)

FOREIGN PATENT DOCUMENTS

| KR | 10-2017-0128515 A | 11/2017 |
| KR | 10-2018-0025923 A | 3/2018 |
| KR | 10-2019-0036779 A | 4/2019 |

OTHER PUBLICATIONS

Doherty, A. et al., "Dynamic Symmetric Key Provisioning Protocol (DSKPP)," Internet Engineering Task Force (IETF), Request for Comments: 6063, Dec. 2010, pp. 1-105, [Online] [Retrieved on Mar. 10, 2021], Retrieved from the Internet<URL: https://www.ietf.org/standards/rfcs/>.

(Continued)

*Primary Examiner* — Yonas A Bayou
(74) *Attorney, Agent, or Firm* — Fenwick & West LLP

(57) ABSTRACT

Embodiments relate to systems for the distribution of payload in a secure manner. A server may receive a query from a device that includes a subscriber identifier. The server may determine, from confidential information stored, an association between the subscriber identifier and a public key of the device. The server may retrieve the public key of the device. The server may generate a data payload as a response to the query. The server may encrypt the data payload by a symmetric key that is generated randomly. The server may encrypt the symmetric key by the public key of the device. The server may transmit the data payload and the symmetric key that are encrypted to the device for the device to use a private key corresponding to the public key to decrypt the symmetric key and use the symmetric key to decrypt the data payload.

20 Claims, 8 Drawing Sheets

(51) Int. Cl.
  *H04L 9/30* (2006.01)
  *H04L 9/32* (2006.01)
  *H04L 9/40* (2022.01)

(56) References Cited

U.S. PATENT DOCUMENTS

| | | | |
|---|---|---|---|
| 10,614,272 B2* | 4/2020 | Shope | H04W 4/80 |
| 10,721,060 B1* | 7/2020 | Kaizer | H04L 9/3247 |
| 10,805,349 B2* | 10/2020 | Shaw | H04L 63/1433 |
| 10,810,185 B2* | 10/2020 | Soryal | H04L 63/107 |
| 10,880,294 B2* | 12/2020 | Choyi | H04L 67/12 |
| 10,956,880 B2* | 3/2021 | Towle | H04L 67/1001 |
| 11,018,874 B2* | 5/2021 | Dasarakothapalli | ............ |
| | | | H04L 9/3268 |
| 2016/0277391 A1* | 9/2016 | Choyi | H04L 63/062 |
| 2017/0005999 A1* | 1/2017 | Choyi | H04W 12/06 |
| 2019/0036910 A1* | 1/2019 | Choyi | H04L 67/12 |
| 2020/0287876 A1* | 9/2020 | Choyi | H04W 12/08 |

OTHER PUBLICATIONS

Moriarty, K. et al., "PKCS #1: RSA Cryptography Specifications Version 2.2," Internet Engineering Task Force (IETF), Request for Comments: 8017, Nov. 2016, pp. 1-78, [Online] [Retrieved on Mar. 10, 2021], Retrieved from the Internet<URL: https://www.ietf.org/standards/rfcs/>.

PCT International Search Report and Written Opinion, PCT Application No. PCT/US2020/058615, dated Mar. 24, 2021, 10 pages.

* cited by examiner

CENTRALIZED SECURE DISTRIBUTION OF MESSAGES AND DEVICE UPDATES

CROSS-REFERENCE TO RELATED APPLICATION

This application claims benefit to U.S. Provisional Patent Application No. 62/929,889, filed on Nov. 3, 2019, which is incorporated by reference herein for all purposes.

TECHNICAL FIELD

The present disclosure generally relates to message security and device update and, more specifically, to distributing device updates and messages using various encryption techniques.

BACKGROUND

A potential vulnerability for applications is the discovery or alteration of software assets (firmware especially) during an update process. In Internet of Things (IoT) applications, the examination of firmware images can provide the attacker valuable insight into logic errors, vulnerable software libraries, or embedded credentials. Updating a device with maliciously-constructed software may provide attackers a foothold for surveillance and even broader orchestrated attacks, such as with the Mirai botnet's DDOS of multiple web properties.

Friendliness to content distribution networks (CDN) often prefers commonality in the distributable state of firmware packages. However, this may cause a security compromise because the homogeneous packaging of software packages delivered in the industry-recommended fashion allows the discovery of device type and firmware versions, as well as the owners of these devices. A cryptographic fingerprint of the update file can indicate identical devices in an environment by analyzing the network payload of device update traffic. If an attacker knows one type of device and analyzes the update behavior of all devices, the attacker can enumerate similar devices because they will have the same update file hash. With a list of all devices of a certain type in an environment, an attacker can more easily understand the impact of a reproducible attack on a specific make and model of IoT devices. This information can be gleaned from network equipment log information.

Furthermore, by using a CDN, a firmware/software update may be indicated via a URL (Uniform Resource Locator). With such a URL, an attacker, who may intercept traffic from a network (e.g., via a web proxy), may determine all devices which are receiving the update due to the shared usage of the same URL. The version number, model number, and other information regarding the devices may be determined depending upon the exact URL of the update file. This presents an additional security risk as the configuration of the devices on the network can be determined.

Figure 1:
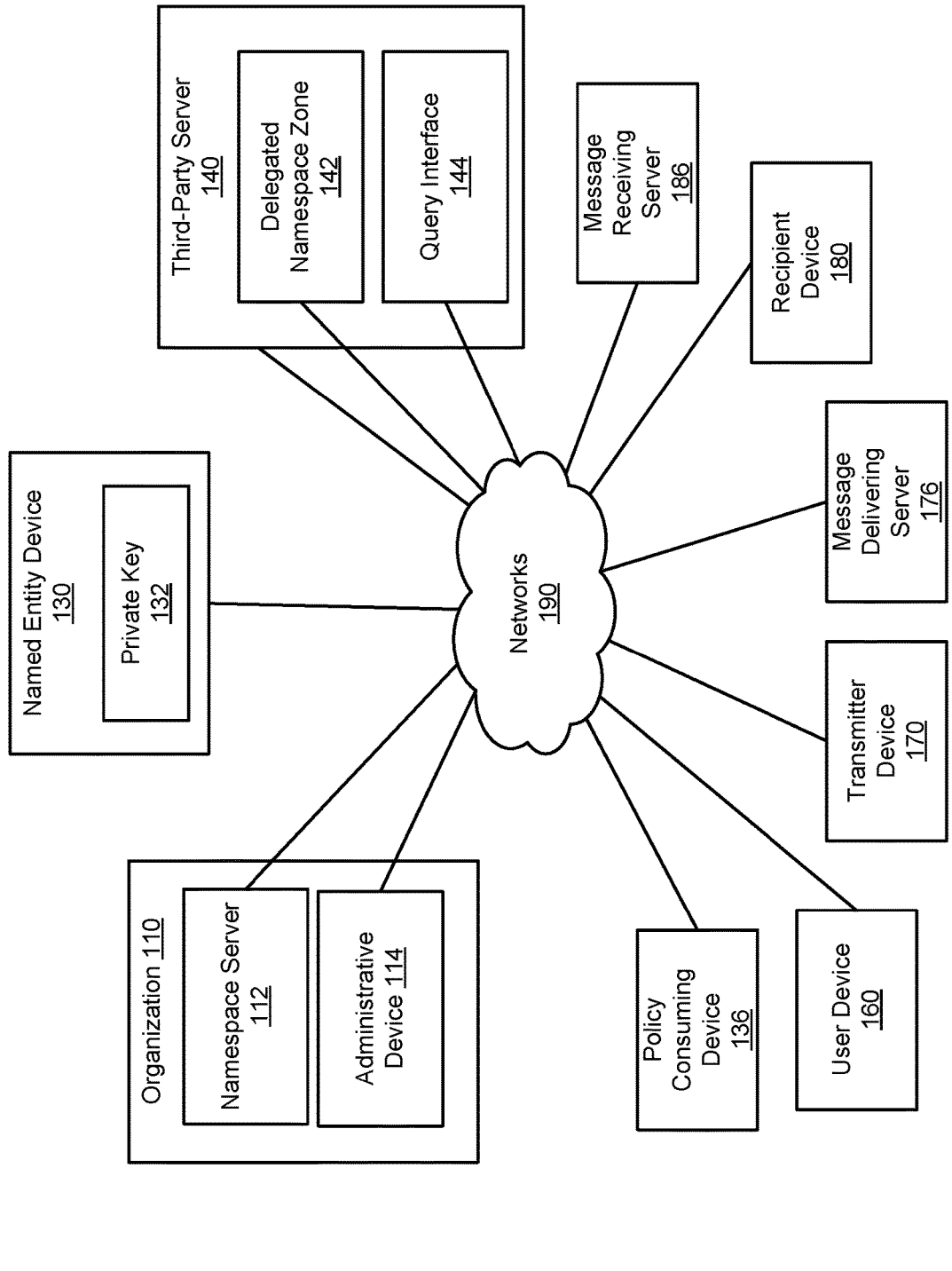
FIG. 1 is a block diagram illustrating an example system environment, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview:

Embodiments described herein are related to a secure message distribution service that may be performed by a third-party server which is delegated to distribute messages on behalf of one or more different organizations. The message distribution may be used for the secure distribution of device updates, such as software and firmware updates and configuration changes of the updates. The message distribution may also be used to transmit secure messages to various subscribers. Each message distributed may be encrypted differently using a freshly and randomly generated symmetric key, regardless of the content of the payload and the recipient. By encrypting messages randomly, the message distribution is not traceable and is more secure against an attack from an adversial party.

By way of example, a third-party server may receive a request in the form of a query for data from a device. The request may include a subscriber identifier that is used by the third-party server. The subscriber identifier may be kept confidential from the general public. The third-party server may store an association between the subscriber identifier and the device's public identity. The third-party server may retrieve the public key of the device based on the association between the subscriber identifier and the device. For each message, the third-party server may freshly generate a random string of bits. The third-party server may use the randomly generated string as a symmetric key to encrypt the response to the query. The symmetric key may be encrypted by the public key of the device. The encrypted response and the encrypted symmetric key are transmitted to the device for the device to decrypt the response content. The device may first decrypt the encrypted symmetric key by using its private key. The device may in turn use the symmetric key to decrypt the response payload.

Example System Environment:

Referring now to figure (FIG. 1, shown is a block diagram illustrating an example system environment 100 of a process delegation system in which an organization may delegate various tasks to a third-party server that is specialized in performing the tasks, in accordance with some embodiments. One of the tasks may be the secure distribution of messages to various devices. The system environment 100 may include an organization 110, a named entity device 130, a third-party server 140 that performs various delegated tasks, a policy consuming device 136, a user device 160, a transmitter device 170, a recipient device 180, and networks 190. In some embodiments, the system environment 100 may also include a message delivering server 176 and a message receiving server 186. In various embodiments, the system 100 may include different, additional or fewer components and entities. Also, in some implementations or situations, certain components' roles may overlap. For example, the named entity device 130 may serve as the policy consuming device 136, the user device 160, the transmitter device 170, message delivering server 176, the recipient device 180, or the message receiving server 186, depending on the situation. The functionalities of each element may be distributed differently among the elements in various embodiments.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, while the organization 110 and the named entity device 130 may be referred to in a singular form, the third-party server 140 may be a service provider that serves multiple organizations 110, each of which may be in communication with multiple named entity devices 130. Conversely, a component described in the plural form does not necessarily imply that more than one copy of the component is always needed in the environment 100.

An organization 110 may be any suitable entity such as a government entity, a private business, a profit organization or a non-profit organization. An organization 110 may define an environment in which a group of units, individuals, and devices organize and perform activities and exchange information. The system environment 100 may include multiple organizations 110, which may be customers of the third-party server 140 that delegate certain tasks to the third-party server 140. For example, an organization 110 may delegate the distribution of secure messages, encrypted device updates, and encrypted configuration settings to the third-party server 140.

An organization 110 has resources that are under its control. Example resources include a namespace server 112 and an administrative device 114. In some embodiments, some of the named entity devices 130 and some of the policy consuming devices 136 may also be part of the organization's resources. For example, some of the named entity devices 130 and policy consuming devices 136 may be controlled and operated by the organization 110.

In some embodiments, each organization 110 may be associated with its own namespace such as a domain (example.com). Some of the resources may be associated with a unique identifier under the namespace of the organization 110. For example, a device under the control of the organization having a domain example.com may have a DNS (domain name system) identifier (device1.example.com) for identification purposes. The device may be a named entity device 130, a policy consuming device 136 or both.

Figure 6:
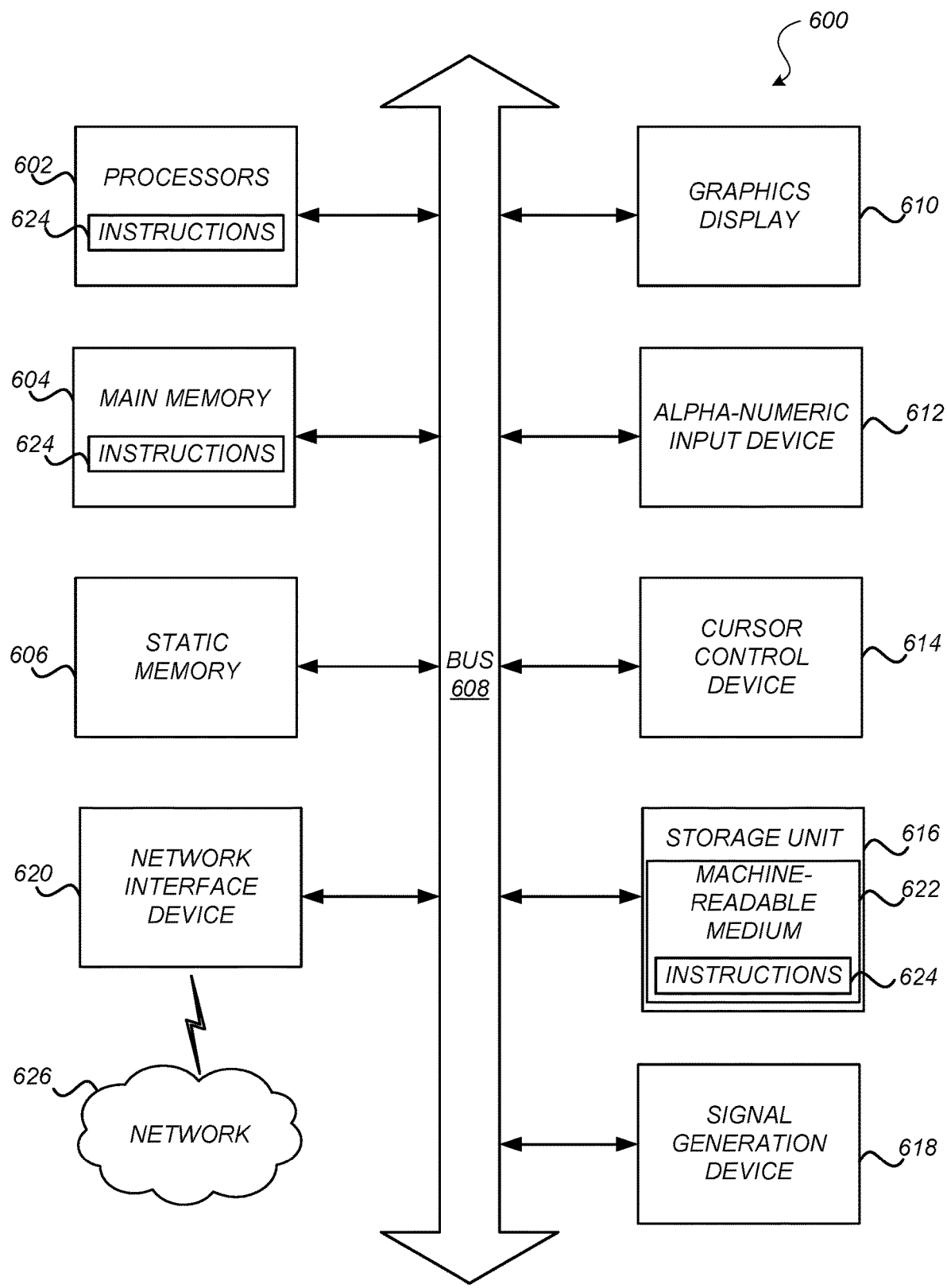
FIG. 6 is a block diagram illustrating components of an example computing machine, in accordance with some embodiments.

To manage its namespace, an organization 110 may include and control a namespace server 112. A namespace server 112 can be a domain owner DNS server. For example, an organization 110 may operate a BIND (Berkeley Internet Name Domain) server. Some or all of the components of a namespace server is illustrated in FIG. 6. The namespace server 112 for an organization 110 operates the namespace of the organization 110 (e.g., the domain of the organization 110), but may delegate a section of the namespace to the third-party server 140. For example, DNS is a distributed system that includes many parties working together to provide a cohesive namespace for the Internet. Starting from the root servers, each branch of the DNS is controlled by a party who may delegate sub-sections of the namespace to other parties. A namespace server 112 associated with an organization 110 may store DNS records for use in a DNS system, manage namespace for the domain name associated with the organization 110, delegate one or more sub-domains to other servers that can be authoritative, and answer queries about the namespace of the domain. A namespace server 112 may store multiple DNS records for a particular domain, such as an A record (address record), MX record (mail exchange record), and so on.

By way of example, an organization 110 named "Example Corp" that operates various devices (each may be an example of a named entity device 130 and/or a policy consuming device 136) may have a website located at www.example.com. The "com" portion of the namespace is maintained by a Top-Level Domain nameserver, which delegates (via a name server (NS) record) the management of the namespace "example.com" to Example Corp. Example Corp is responsible for maintaining the records under example.com, including www.example.com. Since the namespace may be many layers deep, Example Corp may organize its device identities under a specific branch of the DNS, such as "_devices.example.com". A pattern for identifying devices by serial and model, organized under the namespace example.com, may be serial.model._devices.example.com, or 123.sensor._devices.example.com.

In some embodiments, an organization 110 may divide different branches of its namespace to different types of entities and devices. For example, natural persons may be under the namespace_persons.example.com while devices are under the namespace _devices.example.com. In another approach, the named entities may be assigned to a single branch, such as authentication.example.com. The wording used in the namespace can be arbitrary and does not always need to correspond to or have any relationship with the type of the named entity device 130.

DNS provides various types of records, including name-to-IP address resolution. DNS also has the ability to host specialized record types for public keys and certificates (DANE (DNS-based Authentication of Named Entities) or TLSA (Transport Layer Security Protocol), RFC 6698).

DKIM (Domain Keys Identified Mail) (RFC 6376) is another type of record that puts public keys in freeform TXT records.

An organization 110 may include one or more administrative devices 114 that manage the resources and namespace of the organization 110. Some or all of the components of an administrative device 114 is illustrated in FIG. 6. An administrative device 114 may be operated by an administrator, whether it is a robotic agent or a natural person. An administrative device 114 may manage identity records of named entity devices 130 and policy consuming devices 136 that are associated with the organization 110. An administrative device 114 may also manage the configuration of various tasks that may be delegated to the third-party server 140, such as secure message distribution, encrypted device update distribution, namespace management, and authentication services, and policy distribution. For example, an administrative device 114 may provide policy settings to the third-party server 140 to allow the third-party server 140 to distribute various types of messages and data payloads to different devices in an encrypted manner. An administrative device 114 may also change the settings associated with various components and resources in the organization 110.

An organization 110 may create an application environment for various participants to perform activities and interact with each other. The application environment in this context may be distinguished from software applications (software programs) that may also be mentioned in this disclosure. An application in this context may be a system that involves multiple participants that may authenticate and trust one another. The participants may perform certain common operations together and interact with each other. Certain actions may be autonomous or may be decided by individual participants, while other actions may be defined by the policies set forth by the organization 110. An individual participant may communicate with the third-party server 140, which is delegated by the organization 110 to manage the distribution of various messages to the devices in a secure manner. Participants of an application may include named entity devices 130 and policy consuming devices 136. Some of the devices may serve both roles. Examples of application environments may include a distributed application with clients and servers, sensors and actuators, or cameras and recording systems. Other systems are also possible.

In the system environment 100, there can be multiple independent organizations 110, each of which may be in communication with various kinds of named entity devices 130. Various organizations 110 may be of different natures and provide different products and services to their customers. The organizations 110 may be customers of the third party which operates the third-party server 140 and may delegate the third-party server 140 to perform different tasks to various extents. Each organization 110 may specify a different set of rules and policies when interacting with the third-party server 140 and in controlling how the third-party server behaves when performing the delegated tasks.

A named entity device 130 may be a device that is associated with a named entity that has one or more identity records on the Internet. The identity records are often stored and published in a namespace system such as DNS. An entity may be a natural person with a smartcard-based identity, a device with a private key, or an instance of an application, service, or microservice with a name in the DNS. The identity record may include the identity information of the named entity device 130 or a version of the identity (such as the hash of the identity) to preserve the privacy of the named entity associated with the named entity device 130. Examples of named entities may include natural persons (e.g., employees, outside contractors, administrators), properties, Internet of things (IoT) devices, equipment, machines, virtual objects, software applications, services, services, or any suitable objects or concepts that have names for identification. The named entity device 130 may be controlled manually by a person or autonomously by a machine.

By way of example, a named entity device 130 may be a roadside beacon (which may be an IoT device) with an identity record in a DNS zone. The roadside beacon may broadcast signed messages that provide warnings to autonomous vehicles of dangerous road conditions. In this case, an organization 110 may be a traffic regulating entity that also receives messages from the roadside beacon. In another example, a named entity device 130 may be a smart-home appliance that can automatically order an item from a retailer, which is another example of an organization 110. In a third example, a named entity device 130 may be a user device 160 that has a registered account with an organization 110. The implementations and use cases of the environment 100 are not limited to the explicit examples discussed in this disclosure.

Various named entity devices 130 may have different relationships with an organization 110 and may establish connections with more than one organization 110. In one example, a named entity device 130 may be made and operated by an organization 110. For example, an industrial organization may operate various sensors in a facility. The sensors may each be an IoT device that is an example of a named entity device 130. In the cases where a named entity device 130 is part of an organization's resources, the named entity device 130 may be associated with an identity record under the namespace of the organization 110. For example, the named entity device 130 may be associated with a unique identifier "123424.sensor._devices.example.com", controlled by the organization 110 Example Corp. In some cases, a named entity device 130 is not part of the organization 110 but may communicate with a policy consuming device 136 that is under the control of the organization 110 or that acts under one or more policies set forth by the organization 110. A named entity device 130 may be registered with the organization 110 and has one or more roles associated with one or more policies set by the organization 110. For example, a sensor may be registered with the organization 110 as an authorized sender to provide data to autonomous vehicles' computing devices (examples of policy consuming devices 136) that are controlled by or otherwise associated with the organization 110.

A named entity device 130 may have some or all of the components of an example computing device illustrated in FIG. 6. The types of components equipped in a named entity device 130 may vary, depending on its type. A named entity device 130 may be a server computer, a personal computer, a portable electronic device, a wearable electronic device, an IoT device (e.g., a sensor), smart/connected appliance (e.g., a refrigerator), dongle, etc. An IoT device may also be referred to as an Internet-connected device. The processing power of named entity devices 130 may vary and may be limited for certain types. For example, certain specialized IoT devices may be low-power devices that have limited processing power to reduce cost and power consumption. Certain specialized IoT devices may also be pre-programmed with certain computer code that enables the devices to communicate using certain communication protocols (e.g., Narrowband IoT or RFCOMM over Bluetooth, but not a complete TCP/IP stack.)). In some embodiments, some IoT devices may include a memory that can store a limited set of basic instructions, but may not have sufficient computing capability to dynamically determine context-specific policies for a given situation. Those devices may rely on the third-party server to perform computations dynamically for the devices.

In some embodiments, a named entity device 130 may include a private key 132 and a corresponding public key that are generated based on public key infrastructure (PKI). The private-public key pair may be used to authenticate the named entity device 130. For example, the named entity device 130 may generate a digital signature by encrypting a message sent from the named entity device 130 using the private key 132. A party in communication with the named entity device 130 may authenticate the message sender using the public key of the named entity device 130. The private-public key pair may also be used to encrypt messages to be sent to the named entity device 130. For example, the message may be encrypted with the public key of the named entity device 130 and the device, upon receipt of the encrypted message, may use the private key to decrypt the message.

The public key may be saved in a publicly accessible source such as a namespace server (e.g., DNS). For example, the public key may be stored on the named entity device 130 and published in a namespace record (e.g., DNS record) at a location which may be referred to as the device identity name. In some embodiments, both the private key 132 and the corresponding public key are saved in the named entity device 130. The private key 132 may be saved in a hardware secure element of the named entity device 130 such as a trusted platform module (TPM). The hardware secure element safeguards the private key 132 and performs encryption and decryption functions. The hardware secure element may be a secure cryptoprocessor chip. In some embodiments, the safeguard of the private key 132 and the cryptographic functions may also be performed by software.

The third-party server 140 is a computing server that provides various services on behalf of the organization 110 and the named entity device 130. The third-party server 140 may also be referred to as a delegated server. The term "third party" may be viewed from the perspective of the organization 110, which may delegate certain tasks and services to another company, which has the expertise to perform the tasks and services. For example, the organization 110 may be a customer of the third-party server 140. The services provided by the third-party server 140 may include secure message distribution to various devices, encrypted device and configuration update distribution, authentication responses on behalf of organizations 110, policy distribution on behalf of organizations 110, secure software distribution to named entity devices 130, secure information distribution to policy consuming devices 136, and other tasks that may be authentication and authorization of various named entity devices 130 and policy consuming devices 136, such as IoT devices. Some examples of services that may be performed by the third-party server 140 are discussed in further detail below with reference to FIG. 2.

Some or all of the components and hardware architecture of a third-party server 140 are illustrated in FIG. 6. The third-party server 140 may be a server computer that includes software that is stored in memory and one or more processors (general processors such as CPUs, GPUs, etc.) to execute code instructions to perform various processes described herein. The third-party server 140 may also be a pool of computing devices that may be located at the same geographical location (e.g., a server room) or be distributed geographically (e.g., cloud computing, distributed computing, or in a virtual server network).

The third-party server 140 may maintain a namespace zone 142 that is delegated by an organization 110. The namespace zone 142 may be referred to as a delegated namespace zone 142. The delegated namespace zone 142 may be a section of the namespace of an organization 110. The third-party server 140 provides management and maintenance of that section of the namespace. An example delegated namespace zone 142 may be a delegated DNS zone that is hosted by the third-party server 140 on behalf of the organization 110. For example, an organization 110 with the domain "example.com" may delegate the zone of "_devices.example.com." to the third-party server 140 for the third-party server 140 to manage the identity records of certain devices of the organization 110. The delegated namespace zone 142 may include a database that stores identity records of various named entity devices 130.

While in this disclosure the namespace of an organization 110 is described using domain names as examples, other forms of the namespace are also possible. For example, the namespace may be in the form of a file path, XML, Java namespace, uniform resource name, network addresses (e.g., MAC addresses, IP addresses), and other suitable namespace formats. An organization 110 may also design a customized namespace. Various blockchains may also support different namespace formats and the namespace may be reserved for an organization 110 and recorded on a block of the blockchain.

The third-party server 140 may include a query interface 144, which may be a communication interface for the third-party server 140 to communicate with various devices in the system environment 100, such as the named entity device 130, the policy consuming device 136, the user device 160, etc. A device may transmit a query to the third-party server 140. The queries may inquire about different kinds of information such as available software or firmware update, device configuration settings, other device updates, policies and interaction control lists, authentication information, authorization information, confidential messages, private messages, or other information. In response, the third-party server 140 may provide encrypted data payloads as the responses to the devices. The encryption may achieve object security so that encryption can be different even for the same data payload. In some embodiment, the same data payload sent to the same device may also be encrypted differently for each occasion. For example, for each query, the third-party server 140 may generate a different random symmetric key to encrypt the data payload. The symmetric key may be encrypted by the public key of the device making the query.

A policy consuming device 136 may be a device associated with a policy consumer that consumes an interaction control list provided by the third-party server 140. A policy consumer is an entity that consumes policy from the third-party server 140. A policy consuming device 136 may be a named entity device 130, but may also be a device that is anonymous. Also, a policy consumer may be an entity under the direct control of an organization 110 or an entity managed by an unrelated party, with an identity in a managed namespace, like the DNS. The policy consumer may also be a member of the general public, and not represented by a specific named identity. A policy consumer may be the policy consuming device 136 itself, but may also be a part of the policy consuming device 136 that is anonymous. For example, a browser plugin may be a policy consumer that receives interaction control lists but does not have an identity.

Various policy consuming devices 136 may have different relationships with one or more organizations 110 in various situations. In one case, some of the policy consuming devices 136 may be part of the resources of an organization 110. For example, the organization 110 may be a sensor operator that controls a number of sensors in an application environment. In another case, a policy consuming device 136 may be a device whose management falls under a different organization 110 that is not the organization that operates the application environment. For example, an application environment of a podcast system may include a phone and an automobile as participants. The phone may be managed by a phone company and the automobile may be managed by a car manufacturer while the application environment may be managed by a third organization 110 that operates the podcast system. In yet another case, a policy consuming device 136 may be associated with multiple organizations 110 and participate in more than one application. For example, an autonomous vehicle may serve as a policy consuming device 136 that subscribes to a traffic light data service operated by a local government, to traffic and road condition data operated by a real-time traffic conditions provider, and to weather service operated by a private company. Each application environment (e.g., traffic light data, weather service) may have its own rules in terms of authentication and authorization on whether the autonomous vehicle may or may not receive or transmit certain data.

The system environment 100 may also include character-specific devices such as a user device 160, a transmitter device 170, a message delivering server 176, a recipient device 180, and a message receiving server 186. Each of these devices may be a named entity device 130 and/or a policy consuming device 136.

A user device 160 is a computing device that may transmit and receive data via the networks 190. Some or all of the components of a user device 160 is illustrated in FIG. 6. The user device 160 also may be referred to as a client device or an end user device. Various user devices 160 may belong to different parties or may be associated with individual end users. Administrative devices 114, transmitter devices 170, and recipient devices 180 may also be examples of user devices 160. A user device 160 includes one or more applications and user interfaces that may communicate visual, tactile, or audio elements of the applications. The user devices 160 may be any computing devices. Examples of such user devices 160 include personal computers (PC), desktop computers, laptop computers, tablets (e.g., iPADs), smartphones, wearable electronic devices such as smartwatches, or any other suitable electronic devices.

A user may be personnel, an expert, an outside contractor, a customer, or otherwise an end user associated with an organization 110 or someone who is unrelated to any organizations 110. The user also may be referred to as a client or an end user and may control a named entity device 130. A user, through a user device 160, may communicate with other components in the system environment 100 in various suitable ways. For example, a user device 160 may include a user-side software application provided by an organization 110 or the third-party server 140. The user device 160 may interact with those components using a graphical user interface (GUI) of the software application. For example, an administrator (an example of a user) may specify the configurations of the authentication rules using a GUI of an application provided by the third-party server 140. An application may be a web application that runs on JavaScript or other alternatives. In the case of a web application, the application cooperates with a web browser to render a front-end interface. In another case, an application may be a mobile application. For example, the mobile application may run on Swift for iOS and other APPLE operating systems or on Java or another suitable language for ANDROID systems. In yet another case, an application may be a software program that operates on a desktop computer that runs on an operating system such as LINUX, MICROSOFT WINDOWS, MAC OS, or CHROME OS. In other cases, a user may communicate with the third-party server 140 by causing an administrative device 114 of an organization 110 to communicate directly to the third-party server 140, for example, via features such as Application Programming Interface (API) or like technologies such as webhooks. In other cases, a user device 160 may be a transmitter device 170 or a recipient device 180. For example, end users may send messages to each other and the messages may be authenticated through information provided by third-party server 140.

In the system environment 100, a transmitter device 170 and a recipient device 180 may be respectively the message transmitter and the message recipient. Messages are not limited to a particular type or format. Messages can be emails, text messages, instant messages, social media messages (e.g., FACEBOOK messages, posts, and TWEETS), RSS feeds, push notifications, Internet packets, data link frames, or any suitable data payloads. Messages may also include data or executable instructions such as software updates, firmware updates, and device configuration data or files. A message described in this disclosure does not always need to be a human-readable or machine-readable text string or communication. A message may also be information represented in a computer-readable form. A message may be a block of data, a payload, an executable set of instructions, human-written text, or any other suitable information that may be carried by one or more packets, data frames, or other suitable units of data, with or without control information, structured or unstructured, encrypted or not, and indexed or not. In some cases, if a message is sent from a named entity device 130, the message may bear the signature of the named entity device 130. Likewise, if a data payload is sent from the third-party server 140, the data payload may be transmitted with the signature of the third-party server 140 for authentication purposes.

Various transmitter devices 170 may be anonymous or may be named entity devices 130 whose identities are defined under different domains or sub-domains. A transmitter device 170 may be an example of named entity device 130 that is under the control of an organization 110. Messages sent from this transmitter device 170 may be authenticated based on the rules set by the organization 110. For transmitter devices 170 that are controlled by an organization 110 that has a domain, e.g., example.com, the identifiers of the transmitter devices 170 may be under the sub-domain such as _devices.example.com, whose namespace may be delegated to the third-party server 140. Hence, when a recipient device 180 receives a message, the recipient device 180 may send an authentication query to the namespace server associated with the organization 110. The third-party server 140 may operate part of the namespace related to _devices.example.com on behalf of the organization 110. In some embodiments, if a device is communicating with the third-party server 140, the third-party server 140 may also take the roles of transmitter device 170 and recipient device 180.

In some embodiments, a transmitter device 170 and a recipient device 180 may not transmit or receive messages directly through the networks 190. Instead, a message delivering server 176 and a message receiving server 186 transmit and receive messages on behalf of the devices. For example, in the setting of email communications, the message delivery server 176 sends emails on behalf of the transmitter device 170. The message delivery server 176 may include one or more computing systems, which may be configured similarly to the computing system described with reference to FIG. 6. As an example, the message delivery server 176 may be a mailing list server, a bulk mailer provider that sends emails on behalf of a domain, a transactional email system managed by a third-party that sends emails on behalf of a domain, or a security system that scans emails on behalf of a domain. The message delivery server 176 may send the email instead of the named entity device 130 so that the message delivery server 176 may provide additional processing or functionality to the email. In one embodiment, the email sender 114 uses standard mail protocols, such as Simple Mail Transfer Protocol (SMTP). SMTP supports various features. U.S. Pat. No. 9,762,618, entitled "Centralized Validation of Email Senders via EHLO Name and IP address Targeting," patented on Sep. 12, 2017, is incorporated by reference for all purposes. Likewise, in the setting of email communications, a message receiving server 186 may be an email server on the recipient end.

In the setting of IoT device communications, some IoT devices may be equipped with long-range communication capabilities such as LTE or 5G so that the devices can communicate with each other, with transmitter devices 170, and the third-party server 140 directly through the Internet. On the other hand, in some embodiments, some IoT devices may only be equipped with limited communication capability that is confined to a smaller area such as a local area network. In those cases, the IoT devices may rely on message brokers for the communications with transmitter devices 170 and the third-party server 140. In such cases, various message brokers may be examples of message delivering servers 176 and message receiving servers 186.

In various embodiments in this disclosure, for simplicity and unless otherwise specified, the communication between a transmitter device 170 and a recipient device 180 may be described as a message transmitter transmitting a message to a message recipient. This description should include the situation where a transmitter device 170 directly sends a message to a recipient device 180 and the situation where a message delivering server 176 and a message receiving server 186 are involved (e.g., in the context of email communication). The authentication may be performed at the recipient device 180 and/or at the message receiving server 186. For simplicity, a message recipient may refer to a policy consuming device 136, a named entity device 130, a recipient device 180 or a message receiving server 186, depending on the situation and the communication protocol used in transmitting the message. A message recipient may also be referred to as an authenticator. Likewise, a message transmitter may refer to a named entity device 130, a transmitter device 170 or a message delivering server 176. In the context of policy consumption, a message transmitter may be a named entity device 130 and a message recipient may be a policy consuming device 136. If the message recipient transmits a second message to another recipient, the first message recipient may be referred to as a named entity device 130 and the second message recipient may be referred to as a policy consuming device 136.

The networks 190 may include multiple communication networks that provide connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), structured query language (SQL). In some embodiments, all or some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet switching networks such as the Internet.

Example Third-Party Server

Figure 2:
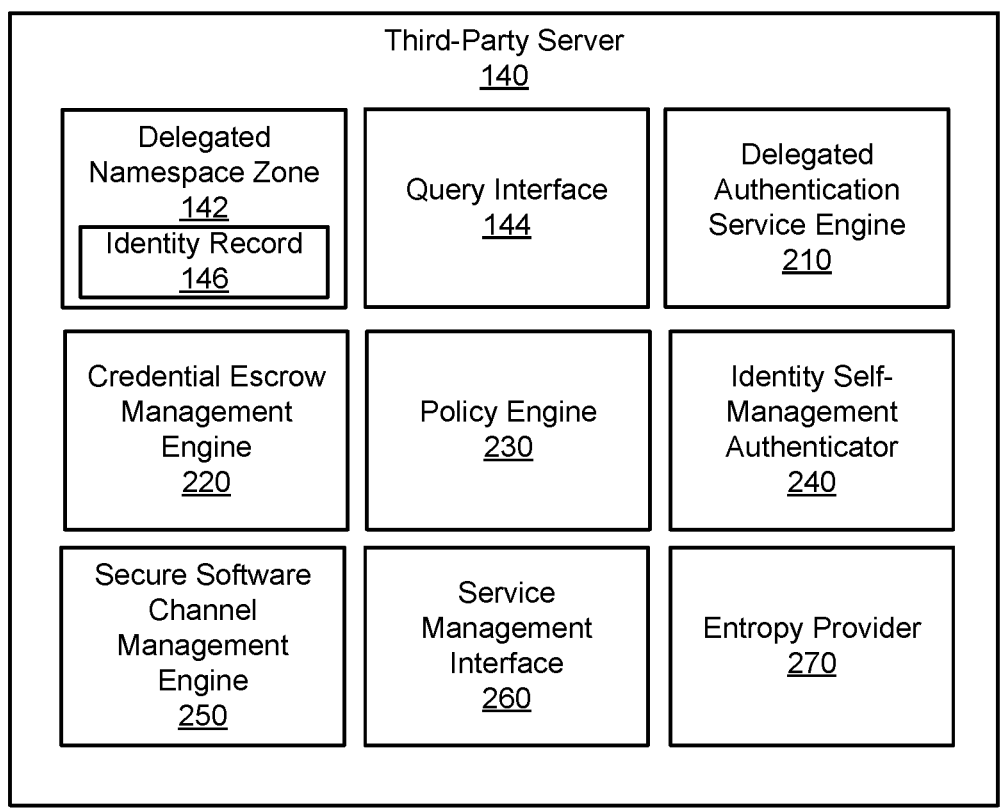
FIG. 2 is a block diagram illustrating various components of an example third-party server, in accordance with some embodiments.

FIG. 2 is a block diagram illustrating an example third-party server 140, in accordance with some embodiments. In some embodiments, the third-party server 140 may include a delegated namespace zone 142, a query interface 144, a delegated authentication service engine 210, a credential escrow management engine 220, a policy engine 230, an identity self-management authenticator 240, a secure software channel management engine 250, a service management interface 260, and an entropy provider 270. In various embodiments, the third-party server 140 may include fewer or additional components, depending on the functionalities of the third-party server 140 in various embodiments. For example, if the third-party server 140 does not perform credential escrow service, the third-party server 140 may not include credential escrow management engine 220. The third-party server 140 also may include different components. The functions of various components in third-party server 140 may be distributed in a different manner than described below. Moreover, while each of the components in FIG. 2 may be described in a singular form, the components may present in plurality.

The components of the third-party server 140 may be embodied as software engines that include code (e.g., program code comprised of instructions, machine code, etc.) that is stored on an electronic medium (e.g., memory and/or disk) and executable by one or more processors (e.g., CPUs, GPUs, other general processors). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 6.

The third-party server 140 may be a computing server that provides various services and performs different tasks on behalf of multiple unrelated organizations 110. Each organization 110 may delegate a section of the organization's namespace to the third-party server 140 as the delegated namespace zone 142. The delegated namespace zone 142 may be used for authentication and authorization. The delegated namespace zone 142 may correspond to a delegated DNS server, a blockchain server, a distributed database server, another suitable server publicly accessible server, or any combination of those servers. If the delegated namespace zone 142 is a delegated DNS, the third-party server 140 is trusted because of the delegated nature of managing DNS zones. Also, the records in DNS may be cryptographically signed to ensure that the records are authoritative and have not been tampered with. If the delegated namespace zone 142 is a namespace under a blockchain, the delegated namespace zone 142 is trusted because the records are tamper-evident.

In various embodiments, the delegated namespace zone 142 may include one or more of the following traits: (1) authenticated (2) delegated and/or (3) able to handle arbitrary content. DNS is one example of such a database. First, DNS allows the known entity to manage its own records within the database. Second, DNS enables hierarchical delegation via NS records so that the known entity can provide others authenticated access with permission on its behalf of a subset of the database. For example, an Example Corp is responsible for maintaining all the records under example-.com, including www.example.com. Because the namespace may be many layers deep, Example Corp may wish to organize its device identities under a specific branch of the DNS, such as "_devices.example.com". Example Corp may delegate the sub-domain to any party, such as the third-party server 140. Third, arbitrary data, such as text-based, encrypted or not, data can be stored in DNS records. In addition to name-to-IP address, DNS can host specialized record types for public keys and certificates (DANE/TLSA, RFC 6698), and DKIM (RFC 6376), which puts a public key in a freeform TXT record. In some embodiments, encrypted data that is encrypted with the public key of a named entity device 130 may be included in a DNS record for the named entity device 130 to retrieve.

In some embodiments, the delegated nature of a namespace system may allow organizations 110 such as Example Corp to delegate special-purpose parts of their namespace (e.g., DNS hierarchy) to a specialized third-party service provider (3 PSP), such as the third-party server 140. For instance, Example Corp may delegate a section of its DNS tree (e.g. "_devices.example.com") to the third-party server 140. The namespace falls under example.com, which may be hosted on computing servers owned by Example Corp, but the _devices.example.com section of the namespace may be delegated by Example Corp to be hosted on the infrastructure of the third-party server 140 as the delegated namespace zone 142.

Although the discussion focuses on the use of DNS as the example distributed database, systems other than DNS may also be used. For example, the Inter-Planetary File System ("IPFS") may also be used. A third alternative example is a blockchain platform supporting application code submissions. While the discussion in this disclosure may focus on the use of DNS for the database, the systems and processes described can be applied to other namespace contexts and implementations. For the rest of the disclosure, even though the descriptions may focus on the DNS, other namespace systems may also apply in a similar manner unless specified otherwise.

The delegated namespace zone 142 may include a plurality of identity records 146. An identity record 146 may be a record that corresponds to a named entity device 130. An identity record 146 may include a unique identifier of a named entity device 130 (e.g., a name), authentication context information, and/or any information that may be used to authenticate the named entity device 130 or verify certain information associated with the named entity device 130. In some embodiments, the identity record 146 may include information that is signed by the private key 132 of the named entity device 130 so that the signer of the information can be easily verified by the device's public key.

While identity records 146 are sometimes discussed in this disclosure with the examples of identifiers or contextual information, the identity record 146 does not need to include any of those examples and may include other types of information that may be directly related to the identity of the named entity device 130. Each organization 110 may include many identity records and may provide a set of those records to the third-party server if the organization 110 decides that the named entity devices 130 correspond to those provided records should be discoverable.

A unique identifier, which may be part of an identity record 146, may be used to identify a named entity device 130 and may be used as a record locator for retrieving the named entity's credential, other contextual authentication information, or other identity information related to the named entity device 130. In some embodiments, an identifier may be in a format under the namespace of the organization 110. An example identifier can be 123.sensor.devices.example.com. In other embodiments, the identifier may also be any text string, arbitrary or not. In some embodiments, the identity records 146 may be saved as key-value pairs in which the identifiers serve as the keys, and the other information are the values. Other formals (e.g., tabular, CSV, tab delimiter, WL, JSON) to store the identity records 146 are also possible.

The query interface 144 may be a communication interface for the third-party server 140 to communicate with various devices in the system environment 100, such as the named entity device 130, the policy consuming device 136, the user device 160, etc. A device may transmit a query to the third-party server 140. The queries may inquire about different kinds of information such as available software or firmware update, device configuration settings, other device updates, policies and interaction control lists, authentication information, authorization information, confidential messages, private messages, or other information. In response, the third-party server 140 may provide encrypted data payloads as the responses to the devices. The encryption may achieve object security so that encryption can be different even for the same data payload. In some embodiment, the same data payload sent to the same device may also be encrypted differently for each occasion. For example, for each query, the third-party server 140 may generate a different random symmetric key to encrypt the data payload. The symmetric key may be encrypted by the public key of the device making the query.

By way of example, the third-party server 140 may receive a query from a device via the query interface 144. The query may include a subscriber identifier of the device. The third-party server 140 may store confidential information that includes an association between the subscriber identifier and a public key of the device. The confidential information is generally not revealed to the public. The third-party server 140 may store the public key directly or may store the identity address of the device. For example, the identity address may be the device's DNS address that stores the device's public key. The third-party server 140 may determine, from the confidential information, an association between the subscriber identifier and the public key of the device. The third-party server 140 may retrieve the public key of the device. In response to the query, the third-party server 140 may generate a data payload. In turn, the third-party server 140 may encrypt the data payload by a symmetric key that is generated randomly. The third-party server 140 also encrypts the symmetric key by the public key of the device. The third-party server 140 transmits the encrypted data payload and the encrypted symmetric key to the device via the query interface 144. The device uses its private key to decrypt the symmetric key. The symmetric key is then used to decrypt the encrypted data payload.

The query interface 144 may serve to anonymize the identities of organizations 110 and devices. For example, the third-party server 140 may serve as a centralized server for the distribution of various messages on behalf of different organization customers. The query interface 144 may have the same address for various organizations 110 for various devices to send queries of different purposes to the same address. The query may be encrypted using the public key of the third-party server 140 so that the third-party server 140 may determine a proper response to the query based on the query content and the metadata of the query. For example, the query may specify the intended recipient of the query is an organization 110 but the intended recipient information is encrypted. In such a case, the organization 110 can be anonymized and the address of the query interface 144 will not reveal the identity of the organization 110 because the organization has delegated the message response task to the third-party server. In some embodiments, the third-party server 140 may provide a specific address of the query interface 144 for a particular organization 110. The address may be under the namespace of the Internet domain of the organization 110 and is delegated to the third-party server 140. While, in this case, the address may reveal the identity of the organization 110, the communication between the third-party server 140 and a device may be encrypted. For example, the messages from the third-party server 140 may be encrypted by different symmetric keys so that the nature of the communication is untraceable.

The query interface 144 may take various forms. For example, in some embodiments, the query interface 144 takes the form of an application programming interface (API) such as REST (representational state transfer), SOAP (Simple Object Access Protocol), RPC (remote procedural call), or another suitable type. In some embodiments, the query interface 144 may be a namespace server such as a DNS server. In some embodiments, the query interface 144 may be a network routing node or a packet switching node. Other types of network interface may also be used as the query interface 144.

The third-party server 140, through the delegated authentication service engine 210, may provide the delegated authentication service on behalf of an organization 110. The delegated authentication service engine 210 may perform different authentication-related services, including providing authentication responses to message recipients for communications between two devices, contextual authentication, and certain authentication on behalf of some message recipients. On behalf of an organization 110, the third-party server 140 may receive an authentication query from a message recipient. The authentication query may include certain metadata of the message or an identifier of the transmitter, which claims to be associated with an organization 110. The identifier in the authentication query may be the same as an identifier stored in an identity record 146 or may include data metadata that allow the third-party server 140 to retrieve the identifier stored in the identity record. In response, the third-party server 140, as an operator of the delegated namespace zone 142, provides the identity record 146 or part of the identity record 146 to the message recipient as the authentication response.

An authentication query may be transmitted from a message recipient, which receives a message purportedly sent from a named entity associated with an organization 110. If the third-party server 140 operates as part of a DNS server, the authentication query may be a DNS query. If the third-party server 140 operates as other types of servers such as a blockchain server, the query may be in other suitable formats. For example, in an embodiment where a blockchain is used, the third-party server 140 may include an oracle machine to provide information to a smart contract saved in the blockchain for the generation of the authentication response. Other implementations are also possible.

On behalf of the organization 110, the delegated authentication service engine 210 may also provide services related to authentication using context information. The third-party server 140 may receive authentication context configurations from various organizations 110. Each organization 110 may have a different setting on the authentication context. The third-party server 140 may translate the authentication context configuration information to a formatted DNS record and publish the record as a resource record under the sub-domain. DNS allows the publication of multiple resource records under the same name. Each organization 110 may manage its own authentication context information and settings via an API or an application provided by the third-party server 140, such as through the service management interface 260. The third-party server 140 translates the authentication context information and settings into namespace records (e.g., DNS records) for publication.

Authentication context information may include credentials (e.g., one or more public keys or another suitable authentication credential of a named entity device 130) and contextual metadata (such as time, location, etc.) that may be needed for a message recipient to authenticate a message purportedly transmitted from the named entity device 130, and other information needed for the authentication. Authentication context information may also be an example of a type of identity records 146. The format of the authentication context information may depend on the type of messages being transmitted. For example, in the context of emails, the format may be in compliance with one or more established standards such as SPF (Sender Policy Framework), DKIM (DomainKeys Identified Mail), TLSA (Transport Layer Security Protocol), DANE (DNS-based Authentication of Named Entities). In other contexts, the format may be in compliance with other protocols that are in various layers such as the application layer, transport layer, or Internet layer. A message recipient may send an authentication query. Upon the right conditions under the rules specified by the named entity device 130, the third-party server 140 provides the message recipient with the authentication context information.

Complexity in communications arises from the contexts constraining the communications. Besides verifying the credential, a message recipient may also verify other contexts. Examples of such contexts may include time (now, not later), location (here, not there), directionality (one way or two way), means (e.g. mobile phone not email), sequencing (in a chain of communications, does order matter?), topology (one-to-one, one-to-many, many-to-one), modifiability (can the communications be modified?), modifications (are they allowed? disallowed?), and form of ID (the primary authenticated key into the database, for DNS this is a domain, for other datastores such as IPFS and blockchain, the keys are different). Non-sub stantive constraining context or limitations to the communications may be managed by the third-party server 140. Further examples of contexts include amplification, aggregation, summarization, shelf life, and revocation. Another example is a computationally intensive context—one requiring specific software developed and installed to perform these computations.

Authentication context settings, which may be provided by an organization 110 and managed by the third-party server 140, may specify what type of information will be provided and how the third-party server 140 should respond when an authentication query is received. For example, in one setting, an organization 110 may specify that a named entity's public key will be forwarded when an authentication query is received. In another example, an organization 110 may specify additional context information (e.g., time, location) for the third-party server 140 to forward. In yet another example, an organization 110 may allow the third-party server 140 to perform certain authentication processes on behalf of a message recipient, such as in a circumstance where the message recipient is a device that may lack the general processing power to perform certain authentication. In yet another example, an organization 110 may require the third-party server 140 to perform authentication of the message recipient before its own name entity's authentication context information is forwarded.

In some embodiments and based on the setting of an organization 110, authentication may be mutual. The third-party server 140 may authenticate the message recipient before any authentication context information is forwarded to the message recipient for the recipient to authenticate the message that is purportedly transmitted under the domain of the named entity device 130. The third-party server 140 may verify the digital signature of the message recipient that may be included in an authentication query.

In some embodiments, the delegated authentication service engine 210 may perform part of the authentication process on behalf of a message recipient. Communications among certain types of IoT devices may be an example that may utilize this feature. Certain IoT devices may be sensors or other devices that have limited processing power. They may include a hardware circuit for decrypting and encrypting cryptographic keys and have limited processing powers designed for performing certain limited actions as a sensor. Those IoT devices may be message recipients that receive information from a beacon that broadcasts the message over radio waves in the vicinity. In some cases, a malicious party may record the broadcast of a message and playback at another location in an attempt to manipulate IoT devices that are not the intended recipients. An IoT device, upon receiving the message, may transmit an authentication query to the third-party server 140. An organization 110 may specify that the third-party server 140 can authenticate the message on behalf of certain devices. For example, the third-party server 140 may verify the location information metadata (an example of contextual evaluation) of the sending location of the message in order to confirm that the message was sent from a legitimate beacon. The third-party server 140 may transmit a response that includes the public key of a named entity device 130 (e.g., the message transmitter) and contextual evaluation result over the Internet that may include DNSSEC (Domain Name System Security Extensions) and TLS (Transport Layer Security) to ensure the response is securely delivered to the IoT device.

The policy engine 230 may determine rules for various participants in an application environment. The policy engine 230 may determine rules for various participants in an application environment. A policy may be defined and initiated by an organization 110. An organization 110 may transmit the policy setting to, or configure the policy setting at, the third-party server 140. The policy engine 230 translates the policy setting to one or more interaction control lists to be distributed to various policy consuming devices 136. Interaction control lists may be a set of rules that define what devices are authorized to interact with a policy consuming device 136 and define how the policy consuming device 136 may behave in certain situations. The policy engine 230 may determine dynamically one or more context-specific policies that are applicable to a policy consuming device 136. The policy engine 230 may transmit the determined policies to the policy consuming device 136 as an interaction control list. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy may include various elements that define the policy settings in an application environment. In one example, elements of a policy may include roles, members, and rules. A role defines a type of participant in the application environment. For example, a type of sensor may assume a certain role in an autonomous vehicle application environment. A role may include a collection of members and rules. The role provides a logical container for how similar members should interact. A member is a participant in an application environment. A member may be a named entity device 130 or a policy consuming device 136. Continuing with the example of a role being a type of sensors, members under the role may be individual sensors that are located in various locations of the application environment. A rule is a description of how members of a role are authorized to interact. For instance, members of a first role may accept certain communications from members of a second role, but not a third role. A rule may also define the format of information accepted by a destination member. A rule may offer granular control over certain field values, such as various values of parameters, metrics, and metadata. A rule may be a feature of a particular role, but may also be a feature of the broader application.

An interaction control list may be a version of a policy and may include relevant data that is packaged in an appropriate format (e.g., a well-known or standardized format) for a policy consuming device 136 to consume. An interaction control list may be derived from a policy, whether the control list is filtered or not, converted or not, combined or not. For example, a policy consuming device 136 may receive a message from a named entity device 130. While the named entity device 130 may be authenticated, the policy consuming device 136 may need to determine whether it is authorized to communicate with the named entity device 130. In turn, the policy consuming device 136 may query the third-party server 140. The policy engine 230 may determine the role of the named entity device 130 and generate a customized interaction control list for the policy consuming device 136. The interaction control list may include a list of authorized named entities with which the policy consuming device 136 is authorized to communicate. The interaction control list may be filtered from the larger policy and may include data that is relevant to the particular policy consuming device 136.

The interaction control list may take different forms. For example, an interaction control list may be a communication policy or protocol that defines how an IoT device may communicate with other devices generally or in specific situations. An interaction control list may also take the form of a set of instructions that may define or alter the behavior of a device. The policy may also take the form of a policy plugin that may enable a device with the plugin to behave in a standard way or be compliant with a standard. In yet another example, an interaction control list may include key-value pairs that include a list of authorized named entity devices 130 and other parameter values that are saved using the parameter name as the key. An interaction control list may use well-known formats such as JSON, XML, but may also in a standardized format that is yet to be developed in the future by an industry that deploys various application environments.

The credential escrow management engine 220 may store confidential credentials (e.g., username and password) of named entity devices 130 and manages the credentials on behalf of the devices 130. In some cases, certain named entity devices 130 may not be complex enough to include the hardware and software (or simply it is too costly to include those secure elements) to safeguard certain confidential credentials, such as text-based credentials that may be used as the API credentials to communicate with an API of the organization 110. Instead of storing the credentials in each named entity device 130, an organization 110 may deposit the credentials of devices 130 that are registered with the organization 110 to the credential escrow management engine 220. The credential escrow management engine 220 may store an association among (1) the identifier of the named entity device 130 saved in the DNS record associated with the device 130, (2) the named entity device's API key identifier (e.g., API username, which may or may not be the same as the identifier in the DNS record), and (3) the device's API secret key (e.g., API password). In some embodiments, the association may also include the named entity device's public key. In one embodiment, to enable the named entity device 130 to communicate with the API, the credential escrow management engine 220 may provide an ephemeral credential (e.g., a session token) for a named entity device 130 to communicate with the API. This limits the exposure of a compromised named entity device 130.

By way of example, the credential escrow management engine 220 may provide a credential of a named entity device 130 to the organization's API to perform the initial authentication on behalf of the device. A named entity device 130 that intends to initiate a communication with the API may provide a request to the third-party server 140. The request may include an identifier of the named entity device 130, such as the identifier in the DNS record of the named entity device 130. In response, the credential escrow management engine 220 may provide the named entity device's API credential (in escrow of the third-party server 140) to the API. The API, upon authenticating the credential, may generate an ephemeral credential such as a session token for the named entity device 130 to establish a communication session with the API. The API may transmit the ephemeral credential to the third-party server 140. The credential escrow management engine 220 may transmit a query to a DNS (or another namespace system) that includes the DNS record of the named entity device 130. The DNS record may include the public key of the named entity device 130. The credential escrow management engine 220 may use the public key to encrypt the ephemeral credential. The credential escrow management engine 220 may publish a namespace record (e.g., DNS record) at the namespace associated with the organization 110. The namespace record contains the encrypted ephemeral credential for the named entity device 130 to retrieve the ephemeral credential at the namespace system. The namespace record may also include a time to live entry that corresponds to a lifetime of the session token. Upon retrieval, the named entity device 130 may use its private key to decrypt the encrypted ephemeral credential. While in this disclosure the credential for API is often described as a time-bound credential, in some embodiments the encrypted credential may also be non-time-bound. For example, the distribution of the credentials may include the distribution of text-based credentials from the third-party server 140 to a named entity device 130. Some APIs do not support the use of a time-bound session token and rely on key/secret (e.g., username/password). The credentials may be stored in the third-party server 140 and may be sent to the named entity device 130 on demand.

The identity self-management authenticator 240 may perform authentication for the self-rotation of certificates. The identity of a named entity device 130 may be asserted by using the private key to decrypt a message encrypted the device's public key, which may be included in a DNS record. For the DNS record of a named entity device 130, the public key or certificate may be removed after a predetermined period to allows an ephemeral PKI-based identity. The identity self-management authenticator 240 may authenticate the ephemeral identity. For instance, if a device has a core identity with name 123.edge._device.example-.com, with a public key at that record, the third-party server 140 may use that identity to establish ownership of (a) names under that place in DNS, which follows the natural hierarchical organization of the namespace, or (b) a delegated identity which may indicate the core identity by a specifically-formatted record in the namespace. For DNS, this may take the form of a TXT record which indicates the parent identity.

The prior example may allow a device at name 123.edge._device.example.com to establish a short-lived public key credential at _serviceclient.123.edge._device.example.com by virtue of the application being configured to allow devices to establish short-lived sub-identities in this fashion. The process of establishing this name-pubkey identity is described in the next example. The difference between this use case and the next may be the method for indicating the authorized parent credential. With this method, it is naturally indicated by the hierarchy of the namespace. In the next, it is deliberately indicated within the namespace or in the application configuration.

The latter example may exist as two DNS records at the name 123.summarizer._device.anotherexample.com. One record is a TXT record which indicates 123.edge._device.example.com as the parent or core identity. The second record at 123.summarizer._device.anotherexample.com may be a TLSA record which contains a public key. The TLSA record at 123.summarizer._device.anotherexample.com is expected to be frequently updated, and if it exceeds its expected lifetime without an update, the record may be removed or 'tombstoned' (having unusable data placed in the record to indicate the identity's existence, but that it should not be trusted). Alternatively, it may make sense for the organization owning anotherexample.com to conceal from publication the parent identity of the device, for privacy reasons (maybe this is a medical device and example.com domain is known for producing a specific type of medical device). In the case where this privacy feature is desired, the third-party server 140 will provide a feature in the management application where the application may correlate the 123.summarizer._device. anotherexample.com device with 123.edge.example.com, for the purpose of authenticating the rotation of the public key.

The process of establishing an ephemeral public key credential at 123.summarizer._device.anotherexample.com may involve the device in possession of the identity as well as the 123.edge._device.example.com to (1) create or obtain a new key pair, (2) create a certificate signing request (CSR) associating the new public key and the 123.summarizer._anotherexample.com name, (3) use the private key associated with the 123.edge._device.example.com identity to generate a cryptographic signature of the CSR and a nonce, (4) transmit the signature, nonce, and CSR to the third-party server 140.

The third-party server 140 may (1) inspect the CSR and retrieve the name of the proposed identity, (2) determine (either by the TXT record or internal application configuration) that the parent identity for 123.summarizer._device.anotherexample.com is 123.edge._device.example.com. (3) retrieve the public key associated with the 123.edge._device.example.com identity and use that public key to authenticate the CSR, nonce, and signature, (4) publish the new public key from the CSR, or a certificate containing the same, at the requested name (123.summarizer.anotherexample.com) for a limited time.

The secure software channel management engine 250 may manage the policy for secure software distribution. The secure software channel management engine 250 may correlate subscriber identifiers to universal identities and software channels. The secure software channel management engine 250 may maintain an internal reference of a named entity device's data, such as the device's subscriber identifier, public key, application type, device type, and other information that is associated with the device. The secure software channel management engine 250 may deliver software to various named entity devices 130 in a secure manner. A device may send a query to the third-party server 140 via the query interface 144. In response, the secure software channel management engine 250 may generate the appropriate data payload as a response to the query. The response may be encrypted as discussed above with reference to the query interface 144.

The secure software channel management engine 250 may maintain a database which correlates subscriber identities with channels of software updates. The secure software channel management engine 250 may be analogous to a subscription service where the channel periodically updates the most recent edition of a firmware bundle or configuration file. When the client device indicates its identity to the firmware management service (such as over HTTPS or MQTT) the secure software channel management engine 250 may correlate the device's identity with the appropriate software channel and indicate to the client device the unique identifier of the current version of the software. The unique identifier may be a version tag (v1.0.1) or a computed hash, or some other way of uniquely indicating the current version of the subscription asset. This response may also contain the certificate or public key of the system that built and signed the versioned asset. When the device receives the version indicator (which may be encrypted using the client identity's public key) the device compares the current version of the asset as described by the third-party server 140 with the current version in use on the device. If there is a version mismatch, the device then requests the most recent version of the asset. The third-party server 140 responds to this request by retrieving the signed asset from an artifact repository or a source repository as data payload. The third-party server 140 may encrypt the asset with the public key associated with the requesting device's identity. This may be a direct encryption using a public key, or it may be a key-wrapping approach where a symmetric key is used to encrypt the payload, and the symmetric key is encrypted by the public key. The symmetric key should be randomly-generated for every download to prevent the analysis of multiple asset update actions using the same symmetric key and to prevent the correlation of device capabilities by correlating the metadata associated with the device update process (like the hash of the encrypted payload). When the device receives the update, the device uses its own private key to unpack the update object. The device may use a certificate and signature embedded in the update object or, if provided, the same provided via the initial update request interaction to verify the software download.

The third-party server 140 may be associated with a source configuration management engine and an artifact management engine. Those engines may be version control engines that manage the source code, libraries, library objects, artifacts, and other binary file objects. A source configuration management engine may manage various source code repositories. Example source configuration management engine may manage repositories that are hosted on GITHUB, BITBUCKET, GITLAB, SOURCEFORGE, etc. An artifact management engine may manage the libraries, library objects, artifacts, and other binary file objects. The artifact management engine may automatically fetch updates to various libraries and clean up libraries. The artifact management engine may also tag various libraries and objects with searchable metadata and indexes. Example artifact management engine may include services such as ARTIFACTORY.

The service management interface 260 may be an interface for an organization administrator to change settings with respect to various engines such as to change message distribution policies associated with the query interface 144, change the authentication policy in the engine 210, to upload credential to the credential escrow management engine 220, define various policies for distribution by the policy engine 230, etc. The service management interface 260 may include a portal for professional developers, an API, and a user-friendly portal for layman use. For example, the service management interface 260 may provide a user-friendly portal for various organizations to adjust various settings.

The service management interface 260 may take different forms. In one embodiment, the service management interface 260 may control or in communication with an application that is installed in an administrative device 114. For example, the application may be a cloud-based SaaS or a software application that can be downloaded in an application store (e.g., APPLE APP STORE, ANDROID STORE). The service management interface 260 may be a front-end software application that can be installed, run, and/or displayed at an administrative device 114. The service management interface 260 also may take the form of a webpage interface of the third-party server 140 to allow organization administrators to access data and results through web browsers. In another embodiment, the service management interface 260 may not include graphical elements but may provide other ways to communicate with organization administrators, such as through APIs.

The entropy provider 270 may be a specialized piece of hardware, software, or a combination that produces high-quality randomized bits for various devices, such as certain IoT devices or other named entity devices that may not be equipped with the component to generate high-quality entropy. Randomized bits may be used to create high-quality cryptographic keys. However, truly randomized bits may be difficult to generate using only computational algorithms. The entropy provider 270 may refer to certain real-world randomized events such as physical phenomenon that is expected to be random. The entropy provider 270 may provide entropy to a named entity device 130 for the device 130 to generate cryptographic keys. In some cases, a named entity device may be a provisioning device. The entropy provider 270 may transmit high-quality entropy to the provisioning device. In turn, the provisioning device uses the entropy to generate cryptographic keys and provision a new device with the keys. The entropy provider 270 may also be used to generate random symmetric keys that are used to encrypt messages and other data payloads transmitted from the query interface 144, whether the data payloads are device updates generated by secure software channel management engine 250 or other types of message payloads.

Example Message Distribution Process

Figure 3:
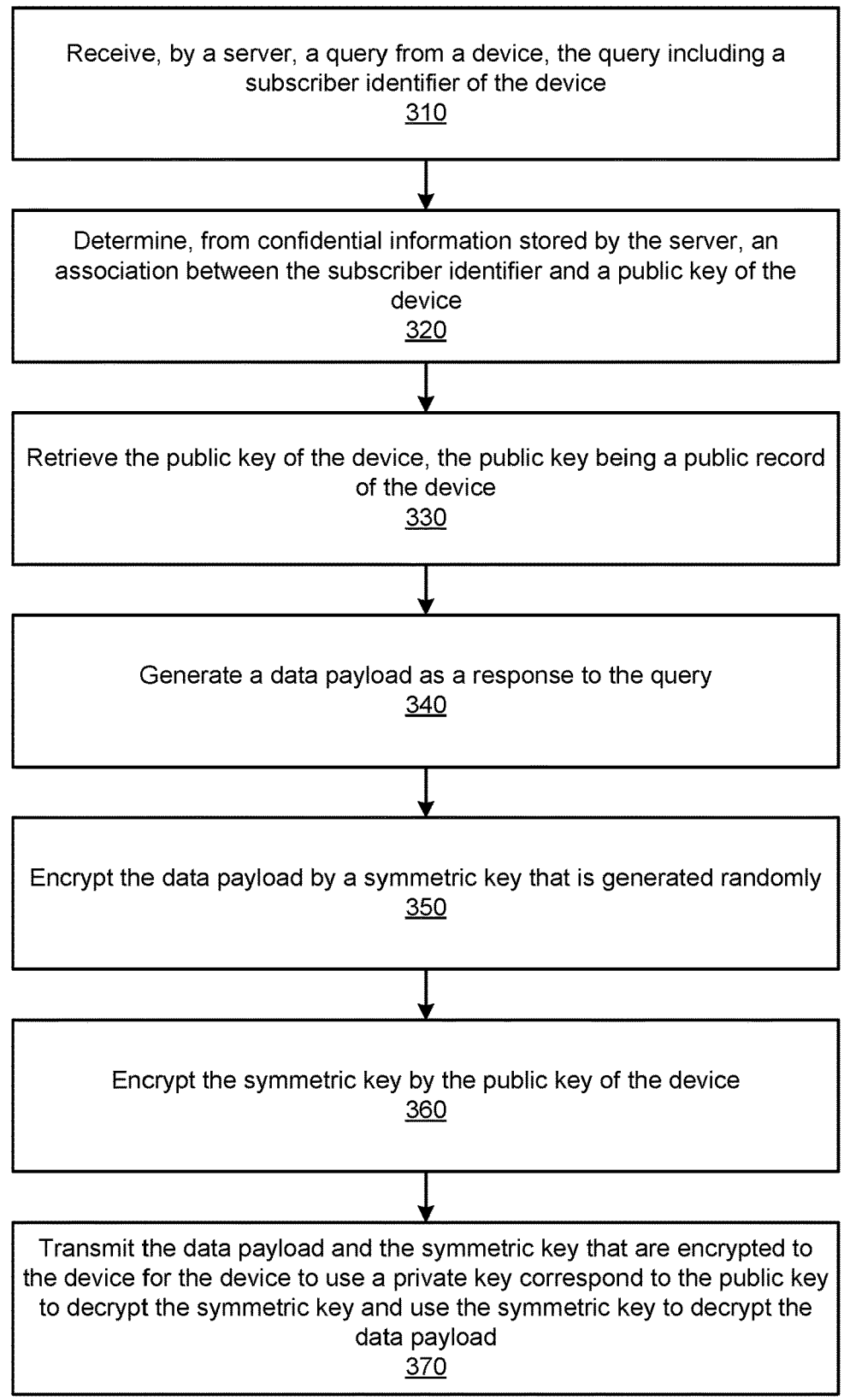
FIG. 3 is a flowchart depicting an example process that illustrates a software algorithm for using a centralized server to distribute messages securely to different devices, in accordance with some embodiments.

FIG. 3 is a flowchart depicting an example process 300 that illustrates a software algorithm for using a centralized server to distribute messages securely to different devices, in accordance with some embodiments. The software algorithm may be stored as computer instructions that are executable by one or more general processors (e.g., CPUs, GPUs). The instructions, when executed by the processors, cause the processors to perform various steps described in the process 300. In various embodiments, one or more steps in the process 300 may be skipped or be changed. The process 300 may be performed by the third-party server 140 or a server of an organization 110. While the process 300 and other processes discussed in this disclosure may be described as being performed by the third-party server 140, these processes may also be performed by other suitable computers. For example, an organization 110 may not delegate the distribution of messages to the third-party server 140. Instead, the organization 110 may have a computing server that directly performs the process 300.

A server, such as the third-party server 140, may receive 310 a query from a device. The device may be any devices in the system environment 100, such as a named entity device 130, a policy consuming device 136, a user device 160, a transmitter device 170, and a recipient device 180. The query may include a subscriber identifier of the device that is used to identify the device from the perspective of the third-party server 140. For example, the subscriber identifier may be an identifier that is used by the third-party server 140 to recognizes devices that have subscribed to the services provided by the third-party server 140. The subscriber identifier may be different from the public identity of the device. The receipt 310 from the device may include a direct transmission of the query from the device or the transmission of the query via one or more intermediate entities or devices such as a message broker.

The query may take different forms, depending on the nature of the communication. In some embodiments, a query may simply be a request. For example, the query may merely be an initial communication request that includes a message and the subscriber identifier. For example, a number of devices can subscribe to a message broadcasting source. The query may be sent periodically to check if there are any updates. In such a case, the query may not need to specify the nature of the data that the device is seeking. Instead, the third-party server 140 will decide the information to be provided to the device. In other embodiments, the query may specify the type of information that the device is seeking. In yet other embodiments, the query may be associated with a device update, such as a request to check if the device needs a new firmware update. The query may include the information needed for the third-party server 140 to determine whether an update is needed. For example, the query may include the current firmware version of the device, the model and specification of the device, the current configuration information of the device, depending on the nature of the update. In yet some other embodiments, the query may be associated with an inquiry as to whether the device needs an update as to the current configuration. The query may include the current parameters used by the device and the subscriber identifier. In yet some other embodiments, the query may be associated with a policy inquiry. For example, the device may be in communication with another device and has authenticated the other device. However, the other device is covered by the policy that is known by the device. The device may send a query to the third-party server 140 to ask for a policy related to whether communication or other interactions with the other device is authorized.

While the process 300 is described with a transmission of a query, in some embodiments no query may be needed to be sent from the device. For example, for some subscription models such as news subscriptions or some types of secret message subscription models, the third-party server 140 may have a list of subscribers. The third-party server 140 may automatically transmit the messages to the subscriber devices without an initiation from any of the devices.

The subscriber identifiers may be non-public identifiers that are used by the third-party server 140 to identify devices that are registered with the server. A device, such as a named entity device 130, may have a public identity such as a DNS address, which may store the public key of the device as a TXT record in the address. The third-party server 140 may have an identifier other than the public identity to identify the device. For example, when a device is manufactured and provisioned, the manufacturer of the device may subscribe to the device to the service provided by the third-party server 140. A subscriber identifier may then be provided to the device and also saved in the third-party server 140. In some embodiments, the device may first subscribe to a service provided by or have an account with an organization 110. The organization 110 registers the device with a subscriber identifier. The organization 110 may delegate the service to the third-party server 140 and provide the subscriber identifier and other credential information to the third-party server 140. In some embodiments, the device may also register with the third-party server 140 when the device is in use. The device may be a user-controlled device that can create different accounts with different companies. For example, a smart refrigerator may allow a user to register with different grocery services, one of which may be provided by the third-party server 140.

In some embodiments, the subscriber identifiers may also be channel-specific. For a single third-party server 140, a device associated with the server may have multiple identifiers, each being specific to a service channel. For example, the third-party server 140 may be delegated by multiple unrelated organizations 110 for a wide variety of services. The third-party server 140 may use a single query interface 144 for different types of services. In one case, the query interface 144 may be accessed by a single web address but the nature of the service requested by the device may be specified in the query and the subscriber identifier specific to the service channel. For example, a device may use the third-party server 140 for software updates, data subscriptions, and policy determinations. Each of the services (software update, data subscription, and policy determination) may be provided by different organizations 110 that delegate the services to the same third-party server 140. Each of the services may be associated with a different subscriber identifier or the same identifier, depending on the implementation. For services associated with the same organization 110, a device may also have different subscriber identifiers. In some embodiments, the third-party server 140 may also set up different query interfaces 144 for different organizations 110. For example, a query may be sent to a web address that is under the domain of an organization 110, even though the web address is delegated to and operated by the third-party server 140.

To enhance the security of the process 300, the query may be encrypted or may include the digital signature of the device. The device may retrieve the public key of the third-party server 140 and encrypt the query content. The query transmitted may include the subscriber identifier, the encrypted content, and a digital signature that is signed by the device using the private key of the device. The computing server 140 may authenticate the query by the public key of the device that is retrieved in step 330 discussed below and decrypt the encrypted content using the server's private key.

Upon receiving the query, the third-party server may determine 320, from confidential information stored by the server, an association between the subscriber identifier and a public key of the device. The association between the subscriber identifier and the public key of the device may also be referred to as a correlation. The association may be stored in a database of the third-party server 140 such as a relational database. The database may store the information needed for the third-party server 140 to retrieve the public key of the device. The information may be a link, a memory location, a DNS address, or even the string that represents the public key. The association may be confidential information that is kept secret by the third-party server 140 and is not generally known by the public. In some embodiments, if the subscriber identifier is provided by an organization 110, the organization 110 may also know the correlation. Even if an attacker successfully retrieves the subscriber identifier by eavesdropping the query, the subscriber identifier may not be useful for the attacker to find out the identity of the device or to retrieve the public key of the device.

The association stored by the third-party server 140 may also include other information such as the nature and specification of the device that may be used for the third-party server 140 to determine the proper response to the query. For example, the query may be associated with a device configuration update. The third-party server 140 may use the subscriber identifier to look for the information for retrieving the public key of the device. The third-party server 140 may look up the device specification to determine the proper response.

The third-party server 140 may retrieve 330 the public key of the device. The public key may be part of a public record of the device 330. There may be different ways to retrieve the public key, depending on implementations. For example, in some embodiments, the third-party server 140 may directly store the public keys of its subscribers in one of the server's data store. In some embodiments, the device may be controlled and operated by an organization 110. The third-party server 140 may query the organization 110 to retrieve the public key. In some embodiments, the public key may be stored in the DNS address representing the device, which may be a named entity device 130. The association between the subscriber identifier and the public key may include the DNS address of the device. The third-party server 140 may retrieve the public address from a DNS system.

The public key retrieved may be used to encrypt a symmetric key, as discussed below in step 360, and may also be used to authenticate the device. For example, the query may be sent with a digital signature that is signed by the private key of the device. The digital signature may include the subscriber identifier that is encrypted by the private key of the device. The query is also transmitted with the subscriber identifier, which may be unencrypted or encrypted by the public key of the third-party device 140. The third-party server 140 compares the subscriber identifier in the digital signature and the subscriber identifier transmitted with the query. If the subscriber identifiers, the device is authenticated. In various embodiments, other ways to authenticate the device is also possible.

Figure 5A:
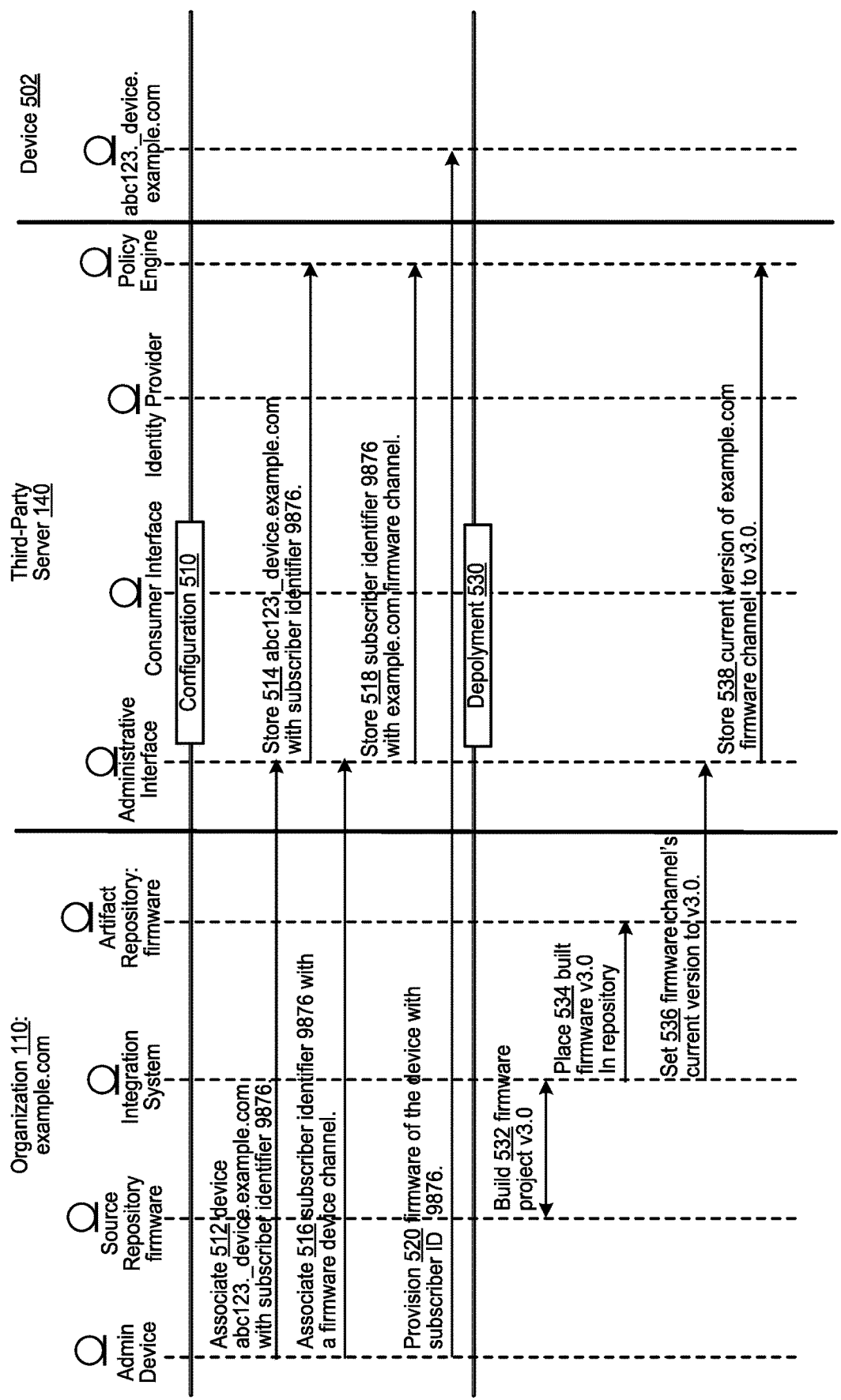
FIGS. 5A, 5B, and 5C, combined, show a flowchart depicting an example message flow process that illustrates a software algorithm for distributing a secure device update, in accordance with some embodiments.
Figure 5B:
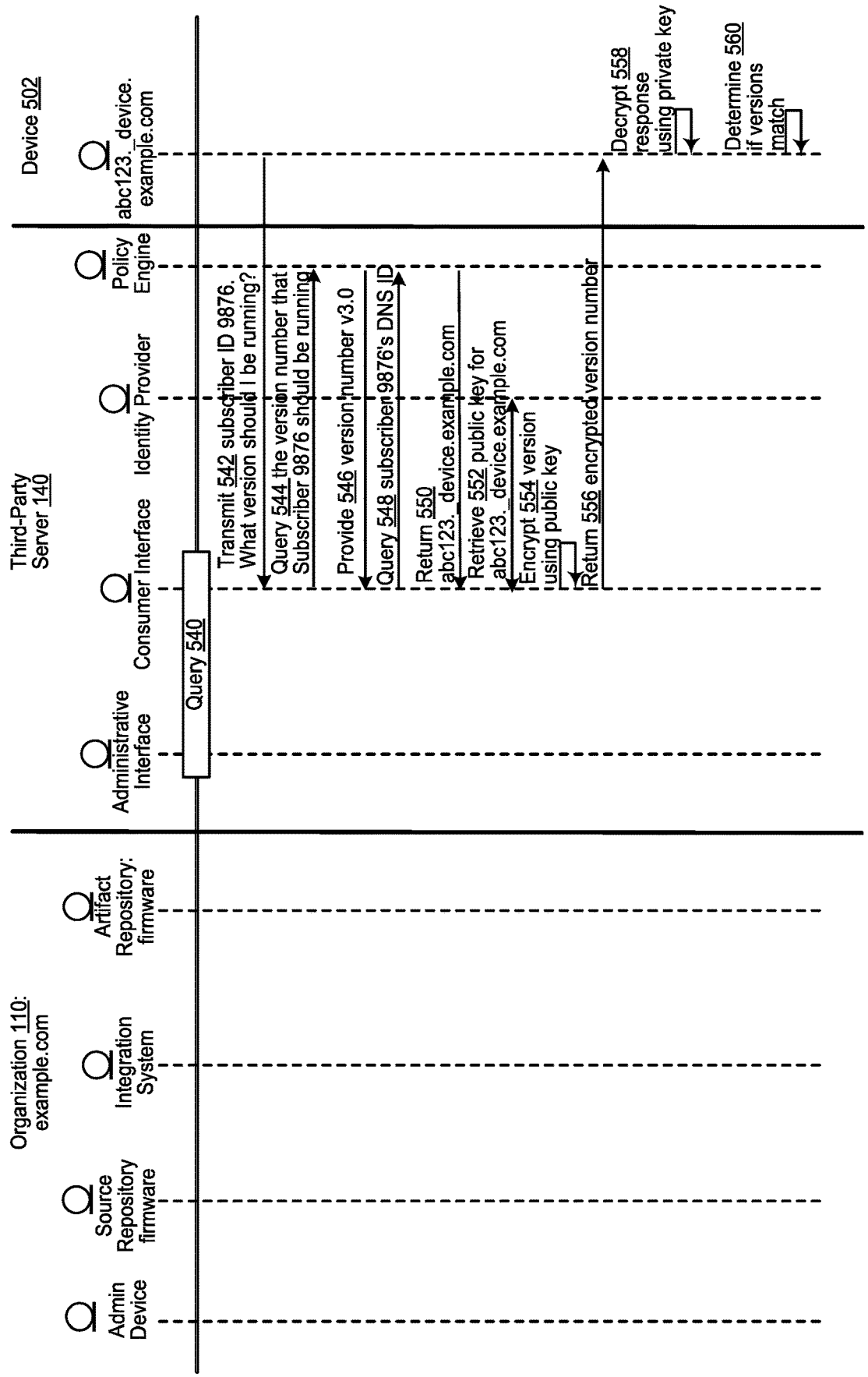
Figure 5C:
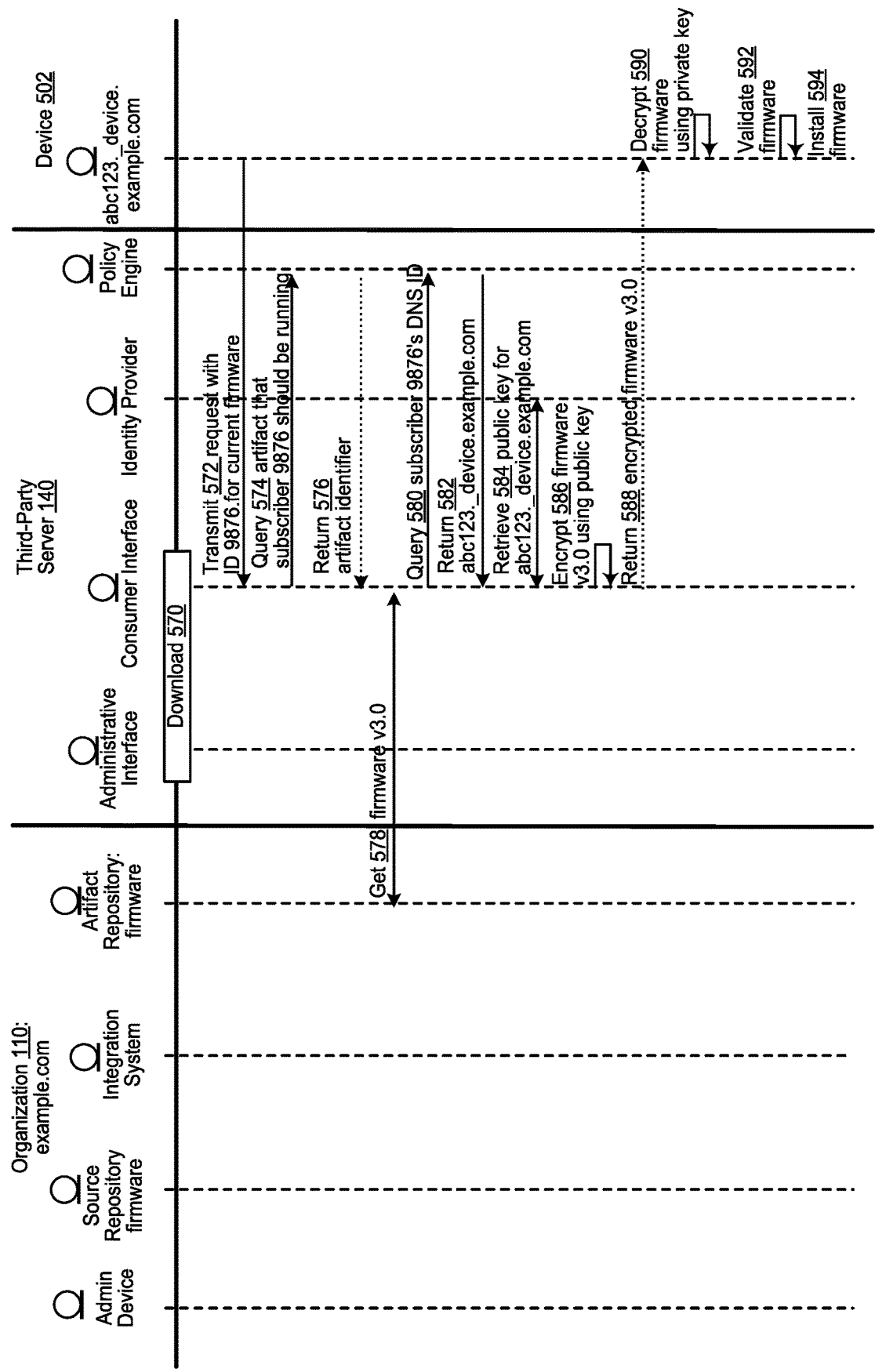

The third-party server 140 may generate 340 a data payload as a response to the query. The data payload may be generated based on the nature of the query. For example, in some embodiments, the query is an inquiry for the latest software version of an application of the device. The query may include the software version. The third-party server 140 may compare the software version provided by the device to the latest version. If the two versions match, the third-party server 140 may generate 340 a data payload that simply notifies the device that the software is up to date as the response of the query. If the two versions do not match, the third-party server 140 may retrieve the latest software and package the software as the data payload. Alternatively, the third-party server 140 may transmit the version information to the device and the device will compare the versions and decide whether to seek an update from the third-party server 140. A more detailed example of this implemented is illustrated in FIGS. 5A through 5C. In another example, the query may seek specific information. The third-party server 140 may generate a response based on the information in the query.

The data payload may be generated 340 in different suitable ways. For example, in some embodiments, certain possible payloads are stored in the third-party server 140. The third-party server 140 simply retrieves the appropriate data payload from its data store. In other embodiments, the third-party server 140 may generate the data payload dynamically based on the information specified in the query. In yet other embodiments, the third-party server 140 may generate the data payload by sending seeking information from an organization 110 which delegates the service to the third-party server 140. For example, in the case of a device update, the organization 110 may store the software and the third-party server 140 may download the software from the organization 110. In the case of other message distribution, the organization 110, which may be the message originator, may send and control the content of the message. The third-party server 140 may serve as a middle server that is used to anonymize the organization 110.

The third-party server 140 may encrypt 350 the data payload by a symmetric key that is generated randomly. A symmetric key may be a key that can be used for both encryption of the data and decryption of the encrypted data. The third-party server 140 may generate the symmetric key completely randomly or at least partially randomly. For example, in some embodiments, the symmetric key may be a completely random string of bits that is generated by the entropy provider 270. In other embodiments, the symmetric key may be generated partially randomly. The third-party server 140 may generate a random nonce and run the payload and the random nonce with a hash algorithm to generate a hash as the symmetric key. Since the part of the underlying data that generates the hash is a random nonce, the symmetric key may be different for each transaction even if the payload is the same.

The symmetric key generated may be different for each occasion where a data payload is generated. For example, the third-party server 140 may generate a random string of bits as the symmetric key every time a data payload is generated. In some embodiments, the symmetric key may be different even for the same payload and for the same device. A device may transmit a query periodically to the third-party server 140. For every response generated by the third-party server 140, the third-party server 140 may generate a random symmetric key that is used to encrypt 350 the data payload.

The use of random symmetric keys to achieve object security may provide advantages over other types of encryption such as connection security. In conventional connection security such as transport layer security (TLS), encryption is established based on a connection session. Within the connection session, messages are encrypted using the same key. Sending identical messages in this type of connection security may be traceable because the encrypted message will be the same. Also, TLS may need to reveal the message content to an intermediate message broker, such as in a case of IoT device implementation because often the connection may be between the third-party server 140 and the message broker before the message is further routed to the device. The use of the object security herein, which may use a random symmetric key to encrypt each message makes the communication undecipherable, execpt by the intended recipient. The compromise of one symmetric key will also not affect the security of other messages. While the use of random symmetric keys is distinguished from TLS, the process 300 does not preclude the use of TLS in conjunction with the use of random symmetric keys.

The use of random symmetric keys to encrypt the data payload may also protect the privacy of the device holder. In certain situations, the communication between a device and an organization 110 may reveal the nature of the holder of the device. For example, the use of a household medical device such as an insulin pump to communicate with the medical device server may reveal that the holder of the device may have a certain disease. The encryption of the messages and the anonymization of the medical device server by delegating the message response to the third-party server 140 protect the privacy of the device holder. In some IoT implementations, communications may be transmitted through insecure communication networks to reduce the overhead of the IoT system. The use of the process 300 alleviates the privacy concern of the IoT devices and the organization 110 operating the devices.

The use of random symmetric keys to encrypt data payload may also prevent an adversial party from deducing information by eavesdropping on the communication networks. For example, since the same payload may be encrypted differently for different recipients, an adversial party will not be able to deduce the number of devices that receive the same message from the third-party server 140. In certain cases where messages are broadcasted to various recipients, the adversial party will not be able to tell whether a particular device receives the message or not. If the payload is encrypted by the same key or is not encrypted at all, an adversial party will be able to deduce that the nature of the recipients. For example, if the same software update is sent to multiple IoT devices in an IoT system, an adversial party may be able to determine that those IoT devices are equivalent. The compromise of one of those devices may make other devices vulnerable.

The third-party server 140 may encrypt 360 the symmetric key by the public key of the device. The encryption may be an asymmetric encryption. By encrypting the symmetric key using the public key of the device, only the possessor of the corresponding private key can decrypt the encrypted symmetric key. In generating the response message to the device, the third-party server 140 may also include a digital signature of the server for the device to authenticate the server. For example, the third-party server 140 may use its private key to sign the digital signature.

The third-party server 140 may transmit 370 the data payload and the symmetric key that are encrypted to the device. The device may use its private key that corresponds to the public key to decrypt the symmetric key. The device may in turn use the symmetric key to decrypt the data payload. The device may also authenticate the message by using the public key of the third-party server 140 to verify the signature. The device may retrieve the public key of the server from the DNS address of the server.

Upon the decryption of the data payload, the device may carry out actions based on the content of the payload. For example, in the case of a device update, the payload may include code instructions. The device may execute the code instruction to perform the device update. The process 300 may also be used to deliver other types of messages, such as interaction control lists, settings, configurations, human-readable messages, articles, confidential information such as secret messages, and other data and information.

The process 300 may provide a system for a third-party server 140 to provide services for organizations 110 to sometimes anonymize the organizations 110 and to protect the privacy of the organizations 110 and the device 110. In some embodiments, the messages between the device and the third-party server 140 are encrypted. The third-party server 140 may also use an address that does not reveal the identity of the organization 110. For example, multiple organizations 110 may share the same address for different devices to reach and seek information from those organizations 110. The third-party server 140 may rely on the subscriber identifier and the nature of the query to determine a response to a device.

Example Device Update Process

Figure 4:
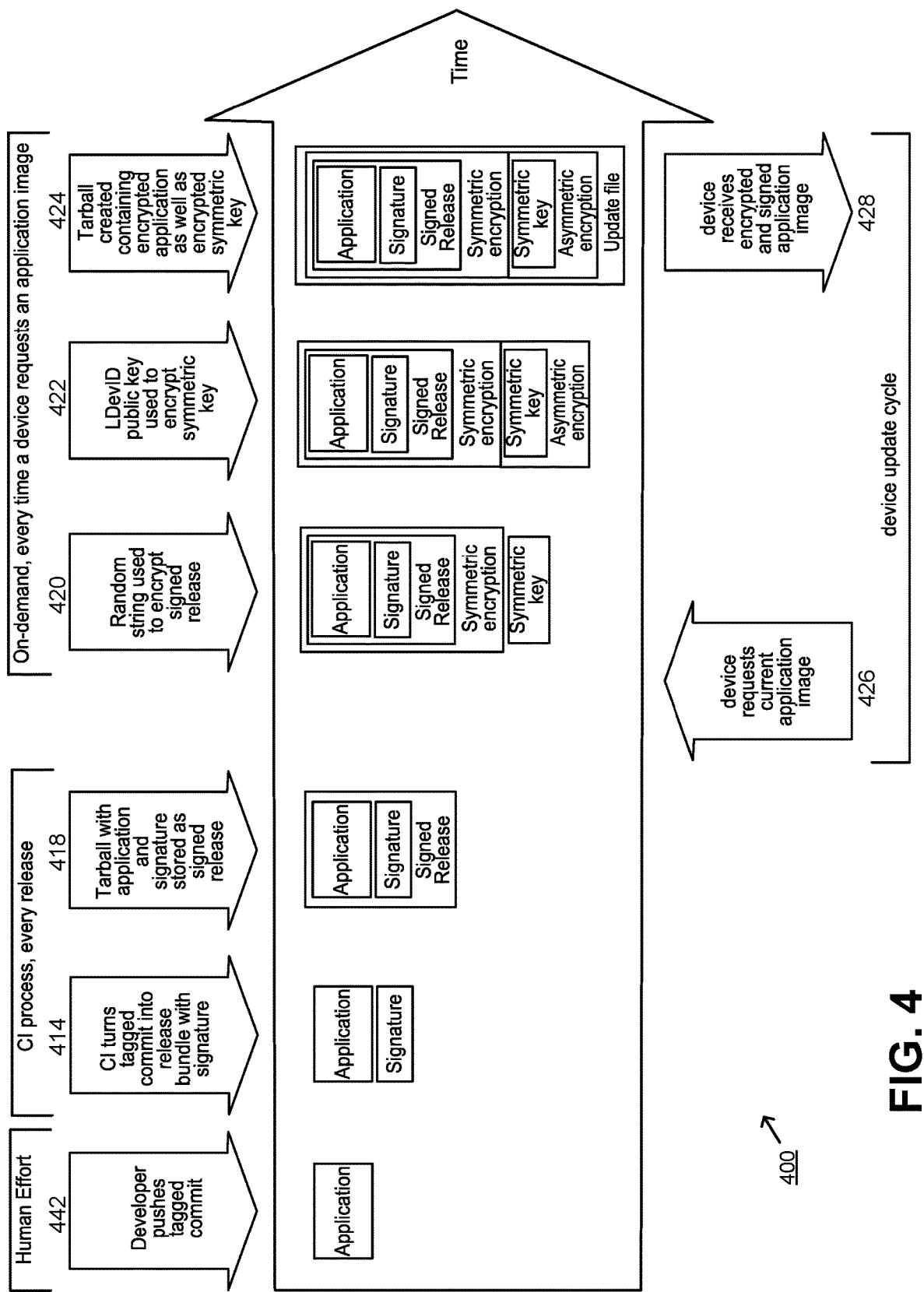
FIG. 4 is a flowchart depicting an example process that illustrates a software algorithm for distributing a secure device update, in accordance with some embodiments.

FIG. 4 is a flowchart depicting an example process 400 that illustrates a software algorithm for distributing a secure device update, in accordance with some embodiments. The software algorithm may be stored as computer instructions that are executable by one or more general processors (e.g., CPUs, GPUs). The instructions, when executed by the processors, cause the processors in different devices to perform various steps described in the process 400. In various embodiments, one or more steps in the process 400 may be skipped or be changed. The process 400 may be performed by the third-party server 400 or a server of an organization 400. While the process 400 and other processes discussed in this disclosure may be described as being performed by the third-party server 140, these processes may also be performed by other suitable computers. For example, an organization 110 may not delegate the distribution of device update to the third-party server 140. Instead, the organization 110 may have a computing server that directly performs the process 400. The process 400 may be an example of the process 300.

The process 400 includes a device, which may be a device operable by a user. The device may be any devices in the system environment 100, such as a named entity device 130, a policy consuming device 136, a user device 160, a transmitter device 170, and a recipient device 180. In one embodiment, the device may be an IoT (Internet of Things) device, such as smart/connected appliance (e.g., a refrigerator), dongle, or other components. The device may also be a smartphone, smartwatch, personal computer, tablet, and so on. In one embodiment, each device has a unique Application Device Identifier (ADI) which is randomly-generated and assigned by a service (to ensure there are no ID collisions). The ADI may be an example of a subscriber identifier. The service may be a package of computer executable instructions executing on one or more computing devices and designed to perform some function(s) for the devices.

Each device also has a public/private keypair. The private key is unique to the device and may be stored in a device-internal or device-attached cryptographic device, like a TPM (Trusted Platform Module) hardware chip, to make exfiltration more difficult. The public key may be stored on the device and published in DNS (e.g., a DNS server) at a location which will be referenced as DIDN-ID. The public key in DNS may be used to verify against communications purported to be from the device to ensure that the communication is securable and authentic. For example, communication coming from the device may be signed by the device's private key to generate a digital signature, which allows confirmation by retrieving the device's public key from DNS and using it to verify the digital signature. The public key that is published in DNS may also be used to encrypt communication meant only for consumption by the corresponding device (which has access to the private key). The DNS establishes trust, and PKI, which is used to decrypt and verify any digital signatures, establishes identity. This allows for proper authentication and verification of the device identity.

The update service, which may be provided by the third-party server 140, may maintain an internal reference of device metadata (DIDN-ID, name, application type, device type, and any other information necessary to associate the device to the appropriate firmware image) to the device's ADI. This allows anonymity for the device, because no part of the ADI conveys or indicates participation in a specific application, device type, or anything other than the device's association with a particular update service. The third-party server 140 may simultaneously service many different device types, applications, or even many different manufacturers.

The identity service may have an application programming interface (API) which allows the device to manage the publication and rotation of its own public key information. The device's public key information is published at the device's DIDN-ID. The software developer system, which may be an example of an organization 110, may include one or more computing devices that may be accessible by a human and is used to generate the computer readable software instructions that are compiled, converted to a firmware package, and consumed by the device. A source code repository is a repository system which allows multiple developers to contribute to the same body of software (e.g., like "git").

A CI/CD system (continuous integration and continuous delivery system) is a process which performs assessment of the software written by a developer, and which is stored in the source code repository. The CI/CD system gives the developer quick feedback on the quality of the software (may take the form of unit tests, static code analysis, integration tests with other services or software systems), and if the qualitative assessment is found to be acceptable, the CI/CD system may publish a built asset (in this particular case, a firmware image) for consumption by the system which runs the firmware. In many environments, the CI/CD system will publish a firmware image on a public web server, and devices can download and install the update at will. The CI/CD system in some embodiments has its own PKI assets which are used to sign (private key) and verify binary files or other data (e.g., using a public key or certificate, published in DNS or otherwise broadly-accessible location).

In the process 400, a developer, via the software developer system, may write software and commits it to the source code repository as noted at block 412.

The CI/CD system may test the developer's code and packages it for distribution as noted at block 414. This firmware package is stored in non-public storage, within the update service or made available to the update service by non-public (authenticated) means. The CI/CD system may sign the software package (producing a file containing the signature, which is referred to as the firmware package signature) and publish the firmware package signature in the update service, as noted in block 418.

The CI/CD system may inform the update service that the currently desired version of software has changed, and sets the associated version identifier for the applicable devices in the update service.

The device may send a request to the update service for a description of the software release that is currently available or desired to be deployed by the developer. The request contains the ADI, which the update service can correlate, using an internal database, with metadata describing the device, as well as the DIDN-ID, which is an identifier of the device, and which may include, for example, the device serial number, model designation, and other identifying information. Each software release may be customized for the specific device which requested the software, and thus the response to the request from the device may vary based on the device. In some embodiments, the device only transmits the ADI. No other information, such as model number, version number, etc., can be determined about the device by a malicious attacker that attempts to intercept the network traffic from the device.

The update service replies with the current version identifier (encrypting it with the public key of the DIDN-ID) for the version of firmware the CI/CD service has set to be run on all devices participating in the application. This could be an incrementing number, a cryptographic hash associated with the version of firmware (git commit ID, or MD5 hash of the finished firmware package), a calendar versioning ID (like 2018.04.01 or 2019-01), or it could use semantic versioning (like 4.2.2). Any combination of these methods or a self-consistent versioning system may be used to identify the version of the firmware (i.e., the software update or software release). The reply from the update service may also contain the public key corresponding to the private key which generated the firmware package signature. This allows the anonymization of the build system's identity, which further obfuscates communication metadata which may lead to the identification of the application in which the device participates. The reply from the update service may also include a nonce, which will be generated fresh with every request. The purpose of the nonce is to ensure that no two responses from the API are identical, once encrypted, in the event a padding algorithm like OAEP is not used. Without the nonce added, repeated requests to the same endpoint may be used to discover update frequency with some temporal precision, and thereby group devices by firmware update frequencies.

In the case where the version identifier is encrypted, the device decrypts the version identifier using the DIDN-ID's private key (stored in the device) and compares the version identifier issued by the update service with the version identifier of the firmware version running on the device. If the version identifier is not identical, the device determines that it should update its firmware to the current version available via the service. Thus, at block 426, the device requests the current firmware version from the update service.

At block 420, the update service may retrieve the firmware package and firmware package signature and generates a random string to be used as the symmetric encryption key. The symmetric encryption key may be generated fresh every time any device requests a firmware update. The update service may create a single enclosing file containing the firmware package and firmware package signature (e.g., in a zip, tarball, or another archive format) which may be referred to as the signed release. The signed release may also contain more files which pertain to the firmware update process. The update service may encrypt the signed release using the symmetric encryption key, producing an encrypted signed release.

At block 422, the update service may encrypt the symmetric encryption key using the device's public key, found at the device's DIDN-ID which was previously published in DNS. The device's DIDN-ID may be stored in the update service's internal database, associated with the ADI of the device. As shown, the LDevID may be analogous with the DIDN-ID.

At 424, the update service may return the encrypted symmetric encryption key and firmware bundle to the device. At 428, the device may use the private key associated with the DIDN-ID to decrypt the encrypted symmetric encryption key. The symmetric key is used to further decrypt the firmware image in the firmware bundle because the compute resources required to unpack large amounts of information using PKI are greater than for symmetric encryption. Thus, the device uses the symmetric encryption key to decrypt the encrypted firmware bundle, and extracts the firmware package and firmware package signature from the bundle. The device further uses the firmware package signature together with the CI/CD's public key to ascertain the integrity and authenticity of the firmware package, for example, by using the public key to verify that the firmware package signature is from the CI/CD's system and that the firmware package signature matches against a hash or other signature generated from the firmware package.

If the device confirms the integrity of the firmware package, the device uses whatever methods to install and make active the new firmware image on the device (e.g., by writing the data from the firmware image to local non-volatile memory).

Example Message Flow Process

FIGS. 5A, 5B, and 5C, combined, show a flowchart depicting an example message flow process 500 that illustrates a software algorithm for distributing a secure device update, in accordance with some embodiments. The software algorithm may be stored as computer instructions that are executable by one or more general processors (e.g., CPUs, GPUs). The instructions, when executed by the processors, cause the processors in different devices to perform various steps described in the process 500. In various embodiments, one or more steps in the process 500 may be skipped or be changed. The process 500 may be performed by with an organization 110, a third-party server 140, and a device 502. The process 500 may be an example of the process 300.

The environment of the process 500 may include the organization 110, which may be denoted as "example.com." The organization 110 may include an administrative device, a source repository for storing source code of various versions of a firmware, an integration system, and an artifact repository for storing artifacts of various versions of the firmware. The environment of the process 500 may also include the third-party server 140. The third-party server 140 may include an administrative interface, which may be an example of service management interface 260, a consumer interface, which may be an example of query interface 144, an identity provider, and a policy engine. The environment of the process 500 may further include the device 502, which has the identity abc132._device.example.com. The device 502 may be an organization resource of the organization 110.

In a configuration phase 510, an administrative device of the organization 110 may associate 512 device abc132._device.example.com with a subscriber identifier "9876" and transmit the association to the administrative interface of the third-party server 140. In response, the third-party server 140 may store 514 the association of abc132._device.example.com with the subscriber identifier 9876 in the policy engine. The administrative device of the organization 110 may associate 516 the subscriber identifier 9876 with a firmware device channel and transmit the association to the administrative interface of the third-party server 140. The third-party server 140 may store 518 subscriber identifier 9876 with the example.com firmware channel in the policy engine. The administrative device of the organization 110 may also provision 520 the firmware of the device 502 with the subscriber identifier 9876 and transmit the subscriber identifier to the device 502.

In a deployment phase 530, the source repository and the integration system of the organization 110 may build 532 a new firmware project, which may be denoted as version v3.0. The integration system may place 534 the built firmware v3.0 in the artifact repository. The integration system of the organization 110 may also set 536 the firmware channel's current version to v3.0 and communicate the current version information to the administrative interface of the third-party server 140. The third-party server 140 may store 538 the current version of the firmware channel for certain devices under example.com to v3.0.

Referring to FIG. 5B, in a query phase 540, the device 502 may transmit 542 the subscriber identifier 9876 to the consumer interface of the third-party server 140 and a query on what version should the device 502 be running. The consumer interface may query 554 the policy engine about the version number that the subscribe 9876 should be running. The policy engine may provide 546 the version number v3.0. The consumer interface may also query 548 the subscriber 9876's public identity, such as the DNS identifier or DNS addresser. The policy engine may return 550 the device's public identity such as abc132._device.example.com. The consumer interface may retrieve 552 the public key of the device 502 from the identity provider by having the identity provider download associated with the name abc132._device.example.com. The consumer interface may encrypt 554 the version number using the public key. The consumer interface may return 556 the encrypted version number to the device 502. Upon receipt of the encrypted version number, the device 502 may decrypt 558 the response using its private key. The device 502 may determine 560 whether the version the device is using matches the version number v3.0.

Referring to FIG. 5C, in a download phase 570, the device 502 may transmit 572 a request with the subscriber identifier 9876 for the current version of the firm to the consumer interface of the third-party server 140. The consumer interface may query 574 the policy engine about the artifact identifier to locate the firmware that the subscribe 9876 should be running. The policy engine may provide 576 the artifact identifier. The consumer interface of the third-party server 140 may get 578 the firmware v3.0 from the artifact repository of the organization 110. The consumer interface may also query 580 the subscriber 9876's public identity, such as the DNS identifier or DNS name. The policy engine may return 582 the device's public identity such as abc132._device.example.com. The consumer interface may retrieve 584 the public key of the device 502 from the identity provider by having the identity provider download the key asssocaied with the name abc132._device.example.com. The consumer interface may encrypt 586 the firmware v3.0 using the public key. The firmware v3.0 may be part of a data payload. The consumer interface may return 588 the encrypted firmware v3.0 to the device 502. Upon receipt of the encrypted data payload, the device 502 may decrypt 590 the firmware using its private key. The device 502 may validate 592 the firmware and install 594 the firmware upon successful validation.

Computing Machine Architecture

FIG. 6 is a block diagram illustrating components of an example computing machine that is capable of reading instructions from a computer-readable medium and executes them in a processor (or controller). A computer described herein may include a single computing machine shown in FIG. 6, a virtual machine, a distributed computing system that includes multiple nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in various figures, such as various servers and devices shown in FIG. 1, various engines and modules shown in FIG. 2. While FIG. 6 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 600 may also include a memory 604 that stores computer code including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 602 and reduces the space required for the memory 604. For example, the machine learning methods described herein reduces the complexity of the computation of the processors 602 by applying one or more novel techniques that simplify the steps in training, reaching convergence, and generating results of the processors 602. The algorithms described herein also reduces the size of the models and datasets to reduce the storage space requirement for memory 604.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though the specification or the claims may refer to some processes to be performed by a processor, this should be construed to include a joint operation of multiple distributed processors.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include an alphanumeric input device 612 (e.g., a keyboard), a cursor control device 614 (e.g., a mouse, a trackball, a joystick, a motion sensor, or another pointing instrument), a storage unit 616 (a hard drive, a solid state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

Using a third-party server 140 as a delegation service for distributing secure messages has various benefits over the organization 110 performing the distribution because: (1) the third-party server 140 sees a lot more parties than does the organization, since the third-party server 140 may provide various services for many other organizations, (2) researching the reputation of a new party is too onerous for an organization, and the third-party server 140 is better situated for this because it sees the widest span of parties, good and bad (3) when business policies change or evolve, propagating the effects of these changes can be too much for the client, so using the third-party server 140 to propagate the changes is much easier.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A system, comprising:
   at least one processor; and
   memory configured to store computer code comprising instructions, the instructions, when executed by the at least one processor, cause the at least one processor to:
      receive, by a server, a query from a device, the query including a subscriber identifier of the device, the device having a private key that is secretly kept by the device, the private key corresponding to a public key that is stored in a domain name system (DNS) address associated with the device;
      determine an association between the subscriber identifier and the public key of the device;
      retrieve the public key of the device from the DNS address;
      generate a data payload as a response to the query;
      encrypt the data payload by a symmetric key that is generated randomly;
      encrypt the symmetric key by the public key of the device; and
      transmit the data payload and the symmetric key that are encrypted to the device for the device to use the private key corresponding to the public key to decrypt the symmetric key and use the symmetric key to decrypt the data payload.

2. The system of claim 1, wherein the symmetric key is generated specific to the query.

3. The system of claim 1, wherein the symmetric key is a string of random bits that are generated independent of bits in the data payload.

4. The system of claim 1, wherein the server is a third-party server that is delegated to respond to the query on behalf of an organization, and wherein the data payload is generated based on information provided by the organization or is provided by the organization.

5. The system of claim 1, wherein the public key is part of a public identity record of the device.

6. The system of claim 1, wherein the public key is retrieved from the DNS address that is a namespace assigned to the device.

7. The system of claim 1, wherein the data payload includes one or more of: a firmware update, a software update, or a configuration setting of the device.

8. The system of claim 1, wherein the data payload and the symmetric key that are encrypted are transmitted with a certificate of the server for the device to authenticate the data payload.

9. The system of claim 1, wherein the data payload and the symmetric key that are encrypted are authenticatable by the device using the DNS associated with the server.

10. The system of claim 1, wherein the data payload is to be transmitted to multiple devices and the server is configured to generate a different symmetric key for each of the multiple devices for encrypting the data payload.

11. A computer-implemented method, comprising:
    receiving, by a server, a query from a device, the query including a subscriber identifier of the device, the device having a private key that is secretly kept by the device, the private key corresponding to a public key that is stored in a domain name system (DNS) address associated with the device;
    determining an association between the subscriber identifier and the public key of the device;
    retrieving the public key of the device from the DNS address;
    generating a data payload as a response to the query;
    encrypting the data payload by a symmetric key that is generated randomly;
    encrypting the symmetric key by the public key of the device; and
    transmitting the data payload and the symmetric key that are encrypted to the device for the device to use the private key corresponding to the public key to decrypt the symmetric key and use the symmetric key to decrypt the data payload.

12. The computer-implemented method of claim 11, wherein the symmetric key is generated specific to the query.

13. The computer-implemented method of claim 11, wherein the symmetric key is a string of random bits that are generated independent of bits in the data payload.

14. The computer-implemented method of claim 11, wherein the server is a third-party server that is delegated to respond to the query on behalf of an organization, and wherein the data payload is generated based on information provided by the organization or is provided by the organization.

15. The computer-implemented method of claim 11, wherein the data payload includes one or more of: a firmware update, a software update, or a configuration setting of the device.

16. The computer-implemented method of claim 11, wherein the data payload and the symmetric key that are encrypted are transmitted with a certificate of the server for the device to authenticate the data payload.

17. The computer-implemented method of claim 11, wherein the data payload and the symmetric key that are encrypted are authenticatable by the device using a domain name system (DNS) associated with the server.

18. The computer-implemented method of claim 11, wherein the data payload is to be transmitted to multiple devices and the server is configured to generate a different symmetric key for each of the multiple devices for encrypting the data payload.

19. A non-transitory computer-readable medium configured to store computer code comprising instructions, the instructions, when executed by at least one processor, cause the at least one processor to:
    receive, by a server, a query from a device, the query including a subscriber identifier of the device, the device having a private key that is secretly kept by the device, the private key corresponding to a public key that is stored in a domain name system (DNS) address associated with the device;
    determine an association between the subscriber identifier and the public key of the device;
    retrieve the public key of the device from the DNS address;
    generate a data payload as a response to the query;
    encrypt the data payload by a symmetric key that is generated randomly;
    encrypt the symmetric key by the public key of the device; and
    transmit the data payload and the symmetric key that are encrypted to the device for the device to use the private key corresponding to the public key to decrypt the symmetric key and use the symmetric key to decrypt the data payload.

20. The non-transitory computer-readable medium of claim 19, wherein the symmetric key is generated specific to the query.

* * * * *